(12) United States Patent
Agarwal et al.

(10) Patent No.: US 7,409,676 B2
(45) Date of Patent: Aug. 5, 2008

(54) SYSTEMS, METHODS AND COMPUTER PROGRAMS FOR DETERMINING DEPENDENCIES BETWEEN LOGICAL COMPONENTS IN A DATA PROCESSING SYSTEM OR NETWORK

(75) Inventors: Manoj K Agarwal, New Delhi (IN); Manish Gupta, New Delhi (IN); Gautam Kar, Yorktown Heights, NY (US); Parviz Kermani, South Salem, NY (US); Anindya Neogi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/689,417

(22) Filed: Oct. 20, 2003

(65) Prior Publication Data

US 2005/0172306 A1    Aug. 4, 2005

(51) Int. Cl.
G06F 9/44    (2006.01)
G06F 3/00    (2006.01)
G06F 9/46    (2006.01)
G06F 11/00   (2006.01)
G06F 7/00    (2006.01)

(52) U.S. Cl. .............. 717/120; 717/121; 719/317; 719/328; 719/316; 718/100; 718/106; 714/26; 714/38; 714/40; 714/47; 707/100

(58) Field of Classification Search .............. 717/120; 707/100–205; 709/220–223, 224; 719/317, 719/318

See application file for complete search history.

(56) References Cited

U.S. PATENT DOCUMENTS

| | | | |
|---|---|---|---|
| 5,664,093 A | 9/1997 | Barnett et al. | |
| 5,696,701 A | 12/1997 | Burgess et al. | |
| 6,249,885 B1 | 6/2001 | Johnson et al. | |
| 6,327,677 B1 | 12/2001 | Garg et al. | |
| 6,393,480 B1 * | 5/2002 | Qin et al. | 709/224 |
| 6,847,970 B2 * | 1/2005 | Keller et al. | 707/100 |
| 2001/0020251 A1 | 9/2001 | Sheikh et al. | |
| 2001/0052087 A1 | 12/2001 | Garg et al. | |
| 2002/0198983 A1 | 12/2002 | Ullmann et al. | |

OTHER PUBLICATIONS

Keller et al., "An Active Approach to Characterizing Dynamic Dependencies for Problem Determination in a Distributed Environment," 2001.*

Keller et al., Dynamic dependencies in Application Service Management, Jun. 2000.*

(Continued)

Primary Examiner—Lewis A. Bullock, Jr.
Assistant Examiner—Insun Kang
(74) Attorney, Agent, or Firm—Gibb & Rahman, LLC

(57) ABSTRACT

Described are methods, apparatus and computer programs for determining run-time dependencies between logical components of a data processing environment. Components of the data processing environment are monitored by monitoring agents accessing run-time activity data via APIs of the managed system. A dependency generator identifies correlations between the run-time activity of the monitored components. For synchronous monitored systems, the dependency generator calculates an activity period for monitored components and determines which component's activity periods contain the activity periods of other components. Containment is used as an indicator of a likely dependency relationship, and a weighting is computed for each dependency relationship based on the consistency of containment.

28 Claims, 7 Drawing Sheets

OTHER PUBLICATIONS

Keller et al., Towards a CIM Schema for RunTime Application Management, Oct. 2001.*

The Open Group, "Systems Management: Distributed Software Administration," published on Jan. 1998.*

R Agarwal, T. Imielinski, and A.Swami, "Mining association rules between sets of items in large databases", *In Proc. Of the ACM SIGMOD Conference on Management of Data*, pp. 207-216, May 1993.

J. Aman, C.K. Eilert, D. Emmes, P. Yocom, D. Dillenberger, "Adaptive Algorithms for managing a distributed data processing workload", *IBM Systems Journal*, vol. 36, No. 2, 1997.

"Systems Management: Application Response Measurement (ARM) API", OpenGroup Technical Standard C807, UK ISBN 1 85912-211-6 Jul. 1998.

S. Bagchi, G. Kar, J.L. Hellerstein, "Dependency Analysis in Distributed Systems using Fault Injection: Application to Problem Determination in an e-commerce Environment" 12th *International Workshop on Distributed Systems: Operations & Management*, Nancy, France, 2001.

A. Brown, G. Kar, and A Keller, "An Active Approach to Characterizing Dynamic Dependencies for Problem Determination in a Distributed Environment", *International IFIP/IEEE Symposium on Integrated Network Management*, 2001.

M.Y. Chen, E. Kiciman, E. Fratkin, A. Fox, and E. Brewer, "Pinpoint: Problem Determination in Large, Dynamic Internet Services", *International Conference on Dependable Systems and Networks (DSN'02)*, Jun. 2002.

J. Choi, M. Choi, and S. Lee, "An Alarm Correlation and Fault Identification Scheme Based on OSI Managed Object Classes," *In 1999 IEEE International Conference on Communications*, Vancouver, BC, Canada, 1999, pp. 1547-1551.

Ensel, Christian, "New Approach for Automated Generation of Service Dependency Models" *Second Latin American Network Operation and Management Symposium, LANOMS*, 2001.

J. A. Farrell and H. Kreger, "Web services management approaches," *IBM Systems Journal*, vol. 41, No. 2, 2002.

B. Gruschke, "Integrated Event Management: Event Correlation using Dependency Graphs", *Proceedings of 9th IFIP/IEEE International Workshop on Distributed Systems: Operations and Management (DSOM 98)*, Oct. 1998.

P. Hasselmeyer, "Managing Dynamic Service Dependencies," *Proceedings of 12th International Workshop on Distributed Systems: Operations & Management (DSOM)*, Nancy, France, 2001.

J.L. Hellerstein and S. Ma, "Mining Event Data for Actionable Patterns", The Computer Measurement Group, 2000.

A. K. Iyengar, M. S. Squillante, L. Zhang, "Analysis and Characterization of Large-Scale Web Server Access Patterns and Performance", *World Wide Web* vol. 2,#1, 2, Jun. 1999.

M.J. Katchabaw et al, "Making Distributed Applications ManageableThrough Instrumentation," *Journal of Systems and Software*, vol. 45, 1997.

S. Katker, "A Modeling Framework for Integrated Distributed Systems Fault Management", Proceedings of the IFIP/IEEE International Conference on Distributed Platforms ICDP'96, Dresden, Germany, 1996.

A.Keller and G.Kar, "Classification and Computation of Dependencies for Distributed Management", 5th *IEEE Symposium on Computers and Communications* (ISCC), Jul. 2000.

F. Kon and R. H. Campbell, "Dependence Management in Component-Based Distributed Systems," *IEEE Concurency*, vol. 8, No. 1, pp. 26-36, Jan.-Mar. 2000.

S. Rangaswamy, R. Willenborg, and W. Qiao, "Writing a Performance Monitoring Tool Using WebSphere Application Server's Performance Monitoring Infrastructure API", *In IBM WebSphere Developer Technical Journal*, Feb. 2002.

M. Steinder and A. S. Sethi, "Multi-layer Fault Localization using Probabilistic Inference in Bipartite Dependency Graphs", Technical Report 2001-02, CIS Dept., Univ. of Delaware, Feb. 2001.

D. Thoenen, J. Riosa, and J. L. Hellerstein, "Event Relationship Networks: A Framework for Action Oriented Analysis for Event Management," *Proceedings of the IFIP/IEEE International Symposium on Integrated Network Management*, Seattle, WA, May 2001, IEEE, New York (2001), pp. 593-606.

S. Yemini, S. Kliger et al., "High Speed and Robust Event Correlation," IEEE Communications Magazine, vol. 34, No. 5, pp. 82-90, May 1996.

M. Steinder and A. Sethi, "The present and future of event correlation: A need for end-to-end service fault localization," 2001.

H. Hrasna, "Java™ 2 Platform, Enterprise Edition, Management Specification JSR-77", Sun Microsystems, Inc., 2002, Chapter JSR 77.6, pp. 53-79.

M. Steinder & A. S. Sethi, "Increasing robustness of fault localization through analysis of lost, spurious, and positive symptoms", IEEE INFOCOM, 2002, pp. 322-331.

* cited by examiner

SYSTEMS, METHODS AND COMPUTER PROGRAMS FOR DETERMINING DEPENDENCIES BETWEEN LOGICAL COMPONENTS IN A DATA PROCESSING SYSTEM OR NETWORK

FIELD OF INVENTION

The present invention relates to data processing methods, systems and networks. In particular, the invention relates to systems, methods and computer programs for determining run-time dependencies between logical components of distributed or stand-alone data processing systems.

BACKGROUND

The identification and tracking of dependencies between components of distributed systems is becoming increasingly important for integrated fault management (problem determination, impact analysis and repair for a set of cooperating components or processes). Distributed systems can be represented as interacting service components, classified into multiple layers, where each layer provides services to layers above. Many service components have dependencies on other service components—such that failures occurring in one service component affect other services and ultimately customer applications. A dependency exists when a first component requires a service performed by another component in order for the first component to execute its functions.

Dependencies can exist between the components of different services on a single system and also between the client and server components of a service distributed across multiple systems and network domains. Typically, dependencies exist between various components of a distributed system, such as end-user services, system services, applications and their logical and physical components.

Relatively frequent failures is a characteristic of most complex operational systems. Recently, attempts have been made to reduce systems' mean time to recovery (MTTR) once failures are detected. In order to reduce MTTR, it is necessary to be able to quickly determine the root cause of a problem that is detected at a higher level, and then to resolve the problem. Many problem determination applications use a component dependency graph to pin-point the root cause.

For example, B. Gruschke, "Integrated Event Management: Event Correlation Using Dependency Graphs", Proceedings of 9th IFIP/IEEE International workshop on Distributed Systems: Operations and Management (DSOM), 1998, discloses the use of a dependency graph for problem determination, mapping incoming alarms and events to nodes of the graph to identify dependent nodes which are a likely root cause of problems.

However, the discovery and recording of dependency information in a distributed system is a time-consuming and difficult task, since service components generally do not expose dependency information in a standard way. The lack of explicit dependency information makes the tasks of problem determination, isolation and resolution particularly difficult.

It is not acceptable to rely solely on dependency information within configuration files or machine-readable files provided by a software vendor, because the vendor's knowledge of dependencies may be limited and because static information within configuration files cannot provide a picture of dynamic, run-time dependencies. Emerging Web-based architectures allow the composition of applications at runtime and an application running within a Web application server may be instantiated and then terminated within a few seconds.

Furthermore, known techniques for automatically determining dependency information rely on fairly invasive middleware instrumentation or internal instrumentation—such as by embedding code which responds to Application Response Measurement (ARM) API calls (implementing The Open Group's Technical Standard C807) but this requires all components to implement the standard. In typical heterogeneous customer environments, which include a collection of hardware and software from different vendors, known approaches for intrumenting managed applications or objects to directly obtain dependency data are difficult and time consuming to implement, and therefore costly. Such instrumentation approaches may even be unusable in heterogeneous environments and in systems with security, licensing or other technical constraints.

One approach to instrumenting the components of a managed system is disclosed by P. Hasselmeyer in "Managing Dynamic Service Dependencies", 12th International Workshop on Distributed Systems: Operations and Management (DSOM), France, 2001. Dependencies are made accessible to management applications as properties attached to components. Dependency data is supplied directly by the component having the dependency. The components can be polled or dependency change notifications can be generated at runtime.

A technique for determining dependency information is described by S. Bagchi, G. Kar and J. Hellerstein in "Dependency Analysis in Distributed Systems using Fault Injection: Application to Problem Determination in an e-commerce Environment", 12th International Workshop on Distributed Systems: Operations and Management (DSOM), France, 2001. The described technique involves injecting a fault into a system during a testing phase and collecting measurements of the external behaviour of the system. The measurements are then analyzed and statistical regression analysis is used to determine the extent to which a quality of service metric depends on specific components. However, fault insertion and other "perturbation" techniques are reliant on the ability to insert controlled perturbations which will be effective in discovering dependencies. Furthermore, typical fault insertion techniques are limited to a testing phase because the insertion of faults is generally unacceptable at run-time.

C. Ensel, "Automated generation of dependency models for service management", Workshop of the Open View University Association (OVUA), 1999, suggests that generation of service dependency models may be automated using a Neural Network and information collected at run-time. Information such as, for example, CPU usage of an application is taken from lower layers such as the operating system, middleware or transport system. According to Ensel, a time series of objects' activities may then be fed into a Neural Network to judge whether the objects appear to be related. Ensel states that a complex training process is required, but does not describe the training process or how the Neural Network would determine dependencies.

SUMMARY

Aspects of the present invention provide methods, apparatus and computer programs for determining dependencies between logical components of a data processing environment by observing the run-time behaviour of the components comprising the environment.

A first embodiment of the invention provides a method, implemented in a data processing system, for determining run-time dependencies between logical components of a data processing environment, the method comprising the steps of:

monitoring run-time activity of each of a first logical component and a second logical component of the data processing environment;

comparing the monitored run-time activity of the first logical component with the monitored run-time activity of the second logical component to identify correlations between the monitored run-time activity of the first and second logical components; and in response to identification of a positive correlation between the monitored run-time activity of the first and second logical components, recording the existence of a dependency relationship between the first and second logical components.

The step of monitoring run-time activity of a component may include monitoring an activity period corresponding to the period between estimated start and end times for the processing of a request, or monitoring other run-time activity metrics for the monitored components such as the number of invocations within a monitoring period.

Most software vendors provide some integrated instrumentation for monitoring statistics, such as invocation and average execution time counters, for accounting and performance tuning purposes. Embodiments of the present invention can be implemented to use these existing monitoring features, avoiding the need for additional intrusive instrumentation of the components to be monitored.

In one embodiment, a set of monitoring agents cooperate with existing counters implemented within the monitored components. The monitoring agents generate an event on completion of processing of a request by the monitored resource, and the events are used to calculate an activity period which contains the period of execution of the component. A correlation identifier then compares the activity periods for different components to identify correlations, such as identifying components which have an activity period containing the activity period of other components. The correlation identifier may be implemented as a correlation-checking computer program.

In a particular embodiment, the correlation identifier determines whether a positive correlation between two components' run-time activity periods is identified consistently for a plurality of activity periods. The correlation identifier applies to each dependency relationship a 'probability' value (or 'weight') representing the proportion of compared activity periods for which a positive correlation is identified. The 'probability' value may be used to sort identified dependencies into an order for subsequent processing.

One embodiment determines whether an activity period of a first component contains the activity period of the second component to determine whether the first component has a synchronous dependency relationship with the second component. The first component's activity period contains the second component's activity period if two conditions are met: the start time of the second component is no earlier that the start time of the first component, and the end time of the first component is no later than the end time of the second component.

Vendors of 'middleware' computer programs, such as Web application servers, database servers and other application-enabling computer programs, typically provide interfaces for accessing essential management data (which can be in the form of logs) that pertains to the state of their programs and applications running on those programs. However, most vendors do not provide explicit information regarding dependencies between the components. A method according to an embodiment of the invention uses activity-related data which is accessible from a managed system, and computes probable dependencies between components of the managed system from the accessed activity data.

A method according to one embodiment of the invention includes data mining run-time monitoring data to construct a dynamic dependency graph between the components of a distributed application. The graph can be updated over time as more monitoring data becomes available. The graph may be used for problem analysis, impact analysis or other systems management applications.

One embodiment of the invention enables extracting of information for determining dependencies within systems ("micro-dependencies") and across systems ("macro-dependencies") of a distributed computing environment without the need to change either the applications installed on the managed systems or the existing application-enabling computer programs that provide run-time support to these applications.

One embodiment of the invention provides the ability to identify probable dependencies between logical components, such as between various cooperating server processes and application programs. The logical components of a data processing environment may include, for example, application programs, servlets and Enterprise Java Beans (EJBs) running within a Web application server, processes serving Uniform Resource Identifiers (URIs), processes executing Structured Query Language (SQL) requests and Web services components. The logical components may originate from a plurality of different vendors. In an enterprise system, a Web transaction (processing a URL request) is typically serviced by servlets which in turn may invoke EJBs or directly execute SQL queries. A Web application may issue SQL queries to a database server. Hereafter, references to the activity period or dependency of a URI should be interpreted as references to the process or transaction executing the URI, and references to the activity period or dependency of an SQL should be interpreted as references to the process or thread executing the SQL request (such as within a servlet or database server).

A second embodiment of the invention provides a data processing apparatus comprising:

a data processing unit;

a data storage unit;

a correlation identifier for receiving, from at least one monitoring agent, monitored run-time activity data of each of a first logical component and a second logical component of a data processing environment, and for comparing the monitored run-time activity data of the first logical component with the monitored run-time activity data of the second logical component to identify correlations between the monitored run-time activity of the first and second logical components; and program code for responding to a positive correlation between the monitored run-time activity of the first and second logical components by recording the existence of a dependency relationship between the first and second logical components.

One or more monitoring agents are preferably installed on the same data processing apparatus as the logical components to be monitored. The monitoring agents send monitoring data to the correlation identifier running on a different data processing apparatus.

A method, a correlation identifier and monitoring agents according to the invention may be implemented in computer program code, and made available as a computer program product comprising program code instructions for controlling the performance of operations within a data processing environment in which the program code runs. The computer program code may be recorded on a machine-readable recording medium or provided via any data transfer mechanism.

BRIEF DESCRIPTION OF DRAWINGS

Embodiments of the invention are described below in detail, by way of example, with reference to the accompanying drawings in which.

DETAILED DESCRIPTION OF EMBODIMENTS

Figure 1:
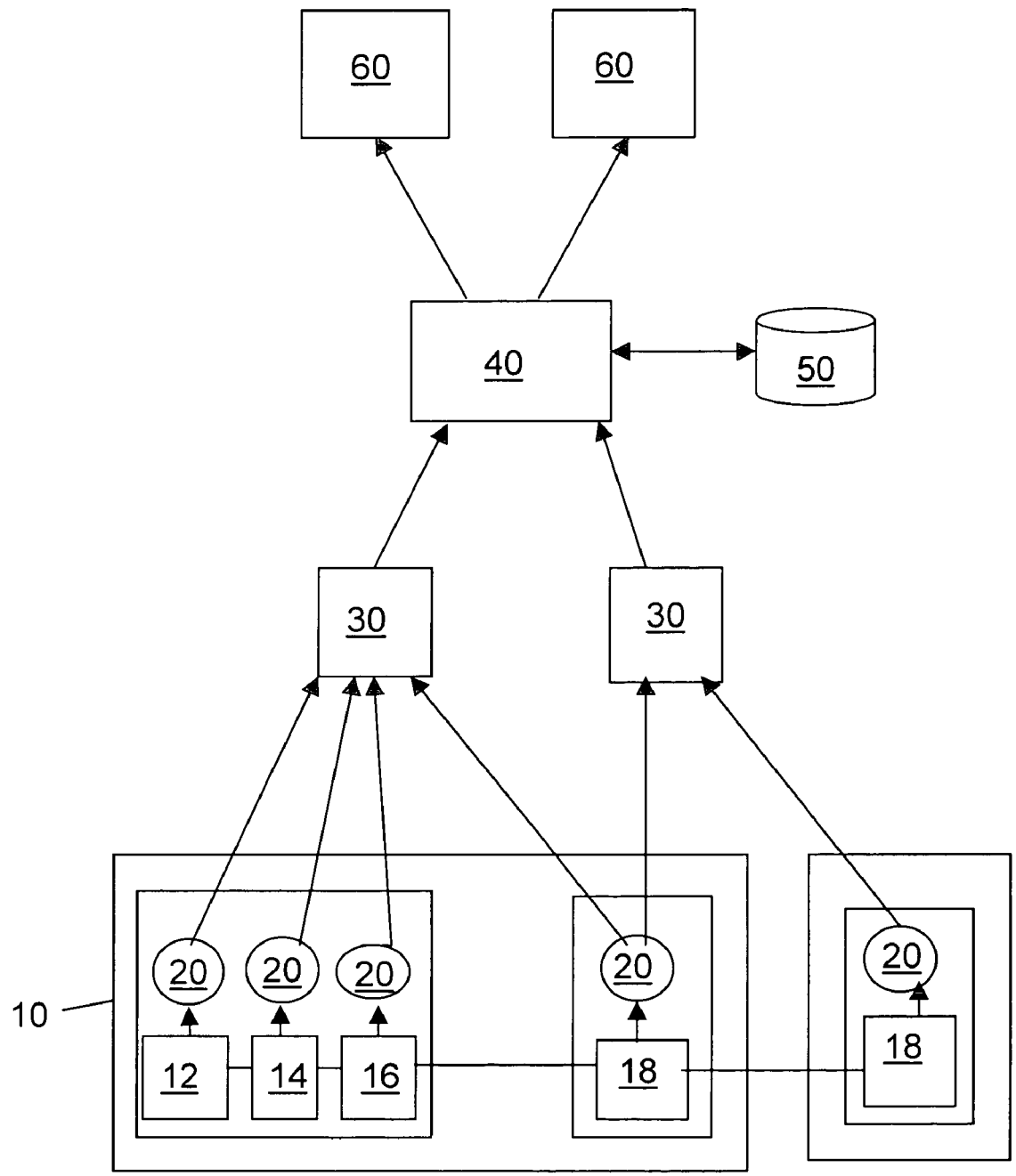
FIG. 1 is a schematic representation of a distributed system architecture, according to an embodiment of the invention.

Described below are apparatus and methods for dependency determination in distributed data processing environments, by computation of probable dependencies based on monitored run-time activity metrics. Dependency graphs are generated and the resulting dependency graphs can be used for problem determination. The methods described below may be used to identify runtime dependencies between, for example, servlets, Web server processes serving Uniform Resource Locators (URLs), Enterprise JavaBeans™ (EJBs), and Structured Query Language (SQL) server processes associated with a Web application.

Some portions of the following description are presented in terms of algorithms and symbolic representations of operations on data within a computer memory. Algorithmic descriptions and representations are used by persons skilled in the data processing arts to convey the substance of their work to others skilled in the art. An algorithm is a self-consistent sequence of steps leading to a desired result. The steps typically require physical manipulations of physical quantities—such as electrical or magnetic signals capable of being stored, transferred, combined, compared, and otherwise manipulated. The signals are conveniently referred to as bits, values, elements, symbols, characters, terms, numbers, or the like. Such terms are to be associated with the appropriate physical quantities and are merely convenient labels applied to these quantities.

Unless stated otherwise, discussions within this patent specification utilizing terms such as "scanning", "calculating", "determining", "replacing", "generating""initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computers or other apparatus. Various general purpose machines may be used with programs in accordance with the teachings herein. Alternatively, more specialized apparatus may be constructed to perform the required method steps.

The present patent specification also implicitly discloses a computer program, since it would be apparent to the person skilled in the art that the individual steps of the methods described herein can be put into effect by computer program code. The computer program is not intended to be limited to any particular programming language or implementation thereof. It will be appreciated that a variety of programming languages and coding thereof may be used to implement the teachings of the disclosure contained herein. Moreover, the computer program or programs are not intended to be limited to a single control flow. Other variants of the program can use different control flows and two or more steps of a described sequence may be performed in parallel rather than sequentially.

Such a computer program may be stored on any machine-readable medium. The readable medium may include storage devices such as magnetic or optical disks, memory chips, or other storage devices suitable for interfacing with a computer or similar device. The machine-readable medium may include a hard-wired medium such as exemplified in the Internet system, or wireless medium such as exemplified in the GSM mobile telephone system. The computer program or programs when loaded and executed on a computer system effectively results in an apparatus that implements the steps of the preferred method.

Where reference is made in any one or more of the accompanying drawings to steps or features which have the same reference numerals, those steps or features have substantially the same functions or operations for the purposes of this description.

The principles of the preferred method described herein have general applicability to the run-time determination of dependencies between logical components or processes in a computing system or network.

Architectural Overview

FIG. 1 shows an example distributed system architecture. The system to be managed 10 comprises a collection of resources comprising hardware, software, and physical and logical components 12, 14, 16, 18. The logical components of the distributed system make configuration and activity data available to the outside world, via a number of Application Programming Interfaces (APIs). Monitoring applications 20 written to use these APIs can access the configuration data and activity metrics. Such monitoring applications 20 on the client-side of the API are termed 'agents' herein. Each agent periodically queries the configuration information and metrics for a particular subsystem or component of the managed system 10. These agent requests for information are an example of client-side initiation of retrieval of required data—referred to herein as a "pull" solution. Alternative embodiments of the invention implement a publish-and-subscribe mechanism to provide activity metrics of interest to the subscriber, or another "push" solution in which the managed system provides information to an agent without requiring periodic requests from the agent. In a publish/subscribe implementation, a managed resource, such as a Web server or database server, may provide an API allowing clients to indicate to the managed resource that the client is interested in certain events and the relevant information is sent to the client whenever the event occurs.

In the present embodiment, the agents 20 poll the system components to obtain activity-related metrics such as performance data, the number of requests sent to a component within a monitoring period or the average response time of a component. In particular, an agent 20 accesses static information within configuration files of the managed system or subsystem that it monitors, and accesses activity-related data within logs created by the managed system. An agent can run in the same host, or even the same process, as the managed system or subsystem or the agent can run on an entirely separate computer system.

The data gathered by an agent 20 from the managed system 10 is then forwarded to a Dependency Generator 30, the responsibility of which is to use this data to identify and record dependencies between system components and variables belonging to the managed system. Dependencies are estimated based on correlations between the run-time activity of components of the system. If the number of requests to a first component is related to the number of requests to a second component within a specific time period, or if the execution times of the two components show a positive correlation, the Dependency Generator 30 determines that a dependency relationship is likely based on the correlation. The operation of the Dependency Generator is described in more detail below.

The identified dependencies are then aggregated and persisted to a database or file system 50 by a Dependency Aggregator 40. A management client application 60 can access the stored dependency data via the Dependency Aggregator, and process the data in various ways such as to perform root-cause analysis, impact analysis, or to repair faults.

Example System and Method

Specific examples of a system implementing the above-described architecture and a method performing automated generation of dependencies are described below with reference to FIGS. 2 and 6. The system comprises three tiers 70,80,90. The bottom tier 70 includes the managed system 10, which in the example described here comprises a Web application server 100 (such as IBM Corporation's WebSphere (™) Application Server software) and a database server 10 such as IBM Corporation's DB2(™) database software). A Web-accessible application program 120 is installed to run on the Web application server 100. Both the Web application server (WAS) 100 and the database server 110 have a monitoring API 132 through which local agents 20 and 22 can access runtime statistics, such as via standard performance-monitoring counters.

The Web application server 100 populates an access log with URIs identifying accessed Web resources, and maintains log records including start and end times for processes running in the managed system 10. The Web application 120 includes a configuration file which identifies the dependence of URIs on the particular servlet which serves requests for the respective URI. The Web application server also includes counters and provides access to a system clock enabling monitoring of access counts and average response times of servlets and EJBs. In the example of IBM Corporation's WebSphere Application Server, counters are implemented within a Performance Monitoring Infrastructure (PMI) component 130.

Figure 2:
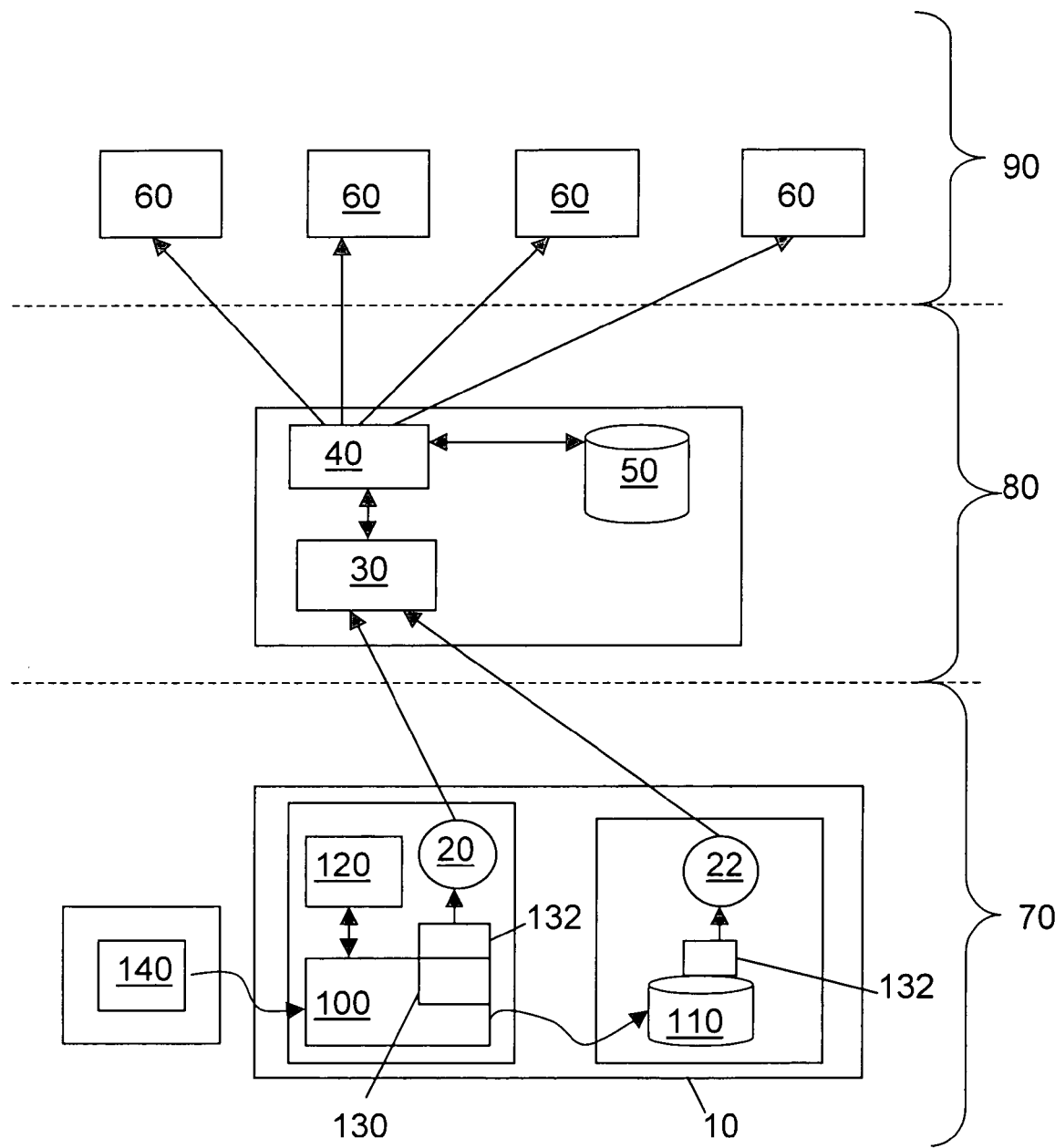
FIG. 2 shows a three-tiered arrangement of system components according to an exemplary embodiment of the invention.
Figure 6:
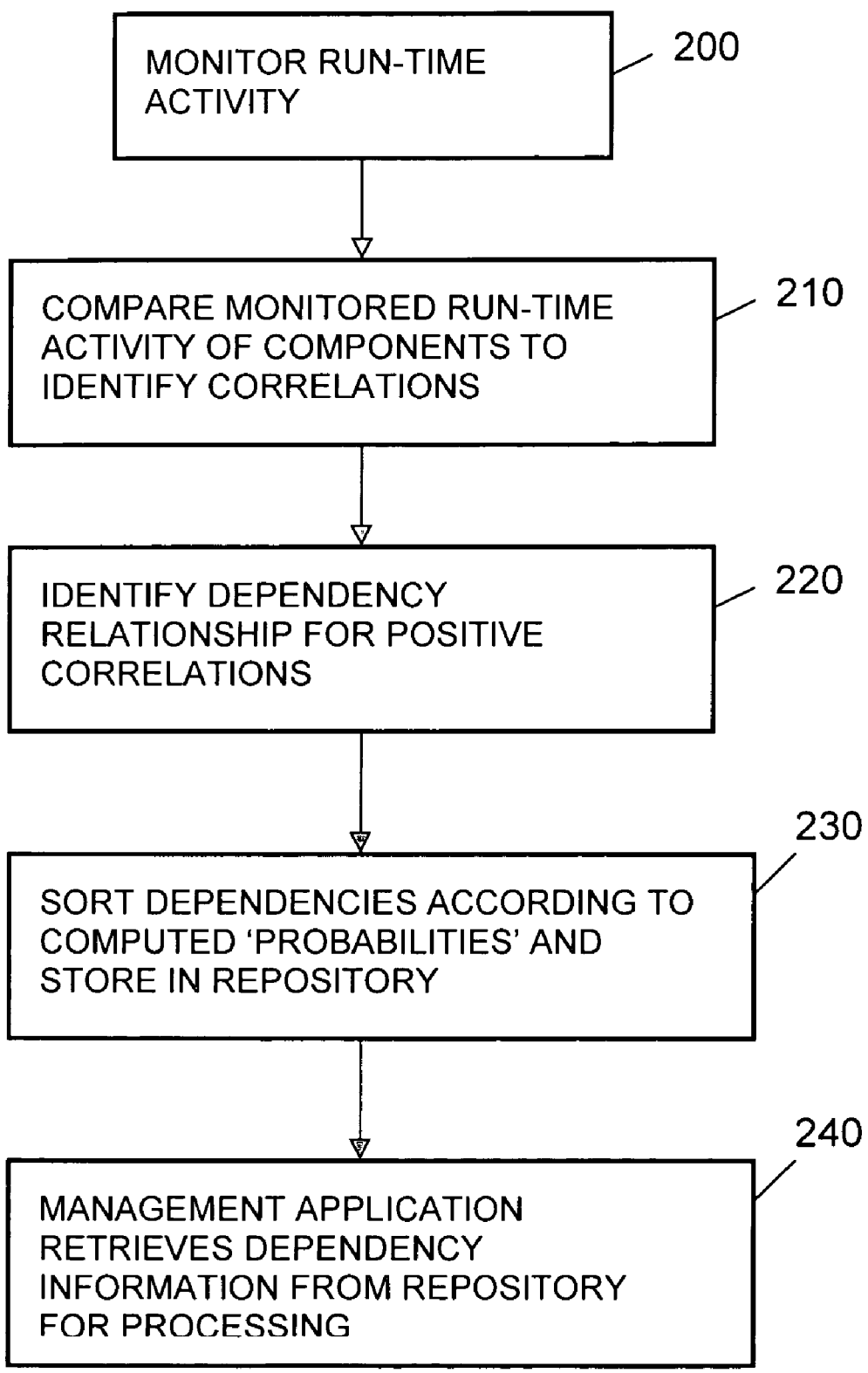
FIG. 6 is a schematic representation of the steps of a method according to an embodiment of the invention.

Referring to FIGS. 2 and 6, run-time activity data is monitored 200 by the local agents 20 and 22 extracting activity-related data from the access log, counters and configuration files, using the monitoring APIs referred to above. The agents may manipulate the raw monitored data to generate more useful activity-related metrics for subsequent processing (for example, aggregating or computing averages). Such manipulation by the agents enables reduction of subsequent network communications. However, alternative embodiments of the invention implement such manipulation at the next layer 80 of the system, to avoid adding complexity to the agents and in particular to avoid imposing a processing overhead on the managed system 10. In the specific implementation shown in FIG. 2, the application server and the database server run on the same computer, and hence both agents 20 and 22 send data that is time-stamped using the same clock. Alternative implementations may include a distributed system, requiring handling of clock synchronization between computers. Such synchronization may be implemented using conventional methods.

The agents 20 and 22 then send the monitored data to a Dependency Generator 30 in the central management layer 80. The Dependency Generator 30 includes a correlation identifier for identifying 210 correlations. The correlation identifier determines an activity period for each process or component, using events indicating completion of request processing to compute theoretical start and end times. The correlation identifier then compares components' activity periods to identify correlations, as described below. A data mining method implemented in the Dependency Generator processes the identified correlations output by the correlation identifier to generate 220 identifications of probable dependencies between the monitored components.

The dependency information is persistently stored 230 in a repository under the control of a Dependency Aggregator 40—implemented as a Common Information Model (CIM) Object Manager. The CIM Object Manager 40 has the following functions:

(1) When adding new objects, a new instance of the type of the object to e added is created and at least some of the properties or fields within this instance are populated. Thereafter, the instance is written to the CIM Object Manager's repository 50.

(2) When modifying objects, a pointer to the stored object is obtained and its fields or properties are changed and the changed object is rewritten to the CIM repository 50.

The CIM Object Manager stores dependency information in a standard CIM format so that the information can be understood by management applications from multiple vendors.

The top-most layer 90 of the system comprises management applications 60 that pull 240 dependency data from the repository through the CIM Object Manager 40, for various uses including, for example, visualization, root cause analysis, and impact analysis applications.

The system described herein reuses existing monitoring data and logs from the managed system to obtain dependency information between URLs, servlets, EJBs and SQLs. URL-to-servlet mappings are obtained by parsing the access log of the Web application server 100 and other activity log records, using the static information present in configuration files of the installed Web application 120 which interfaces to the Web application server. Servlet-to-EJB, servlet-to-SQL, and EJB-to-SQL dependencies can be obtained from events generated through conventional database monitoring functions and the conventional activity monitoring functions of the Web application server 100. An API 132 of the monitoring infrastructure 130 provides access to performance-related activity data relating to processes running in the Web application server.

An example of an existing monitoring infrastructure which is suitable for use within the present embodiment is the Performance Monitoring Infrastucture (PMI) of IBM Corporation's WebSphere Application Server.

Monitoring and Generated Events

The monitoring infrastructure 130 and API 132 provide a framework to extract monitoring data from the Web application server (WAS) 100 and local application components 120 at runtime. The client side of this framework is externalized and published as a lightweight Java™ API 132 that allows monitoring data to be gathered from instrumented components. Within the Web application server 100, the monitoring infrastructure 130 on the server-side of the monitoring infrastructure API 132 keeps the performance data as raw counter values, whereas the agents 20,22 on the client side of the API 132 retrieve and manipulate the raw counters to provide more meaningful statistics such as average, time-weighted average, percentage change, rate, etc. This imposes less overhead on the Web application server 100 than if the Web application server was required to generate statistics from the raw data, and allows the server data to be shared across multiple clients.

A subset of the objects and resources pertaining to the Web application 120, Web application server 100 and the database server 110 are monitored. The monitored objects and resources are referred to hereafter as logical components and may include processes serving URLs, servlets, EJBs, SQL database server processes and database tables. However, since the monitoring methods implemented in the embodiment described here are not limited to monitoring specific types of logical components, the methods may be generalized to other types of logical components. In the present embodiment, the agent 20 obtains activity metrics including access counts and average response times of servlets and EJBs, and obtains accessed URLs from an HTTP access log. The dependence of a URL on the servlet which serves that URL is obtained from a Web application's configuration files. The agent 20 provides to the correlation identifier events for URLs, servlets, and EJBs; whereas agent 22 provides events for SQL request executions.

Each of the URLs, servlets, and EJBs can be modelled using the Common Information Model schema of the J2EE Management Specification (which is described, at the time of writing this specification). For example, we use the following CIM class for the servlet:

```
class J2EE_Servlet:CIM_Service
{
    string UrlPattern;
        [Key, Override ("Name") ]
    string Name;
    string ShortName;
    real64 AvgResponseTime;
    uint64 TotalRequests;
    real64 ResponseTimeOfLastRequest;
    uint64 StartTimeOfLastRequest;
    uint64 EndTimeOfLastRequest;
    uint64 RequestsBeingServed;
};
```

The class CIM_Service is a CIM class that is a super class of class J2EE_Servlet. That is, J2EE_Servlet derives from CIM_Service which is present in the CORE CIM Schema. The field or property "Name" in the class is the key. Monitoring data obtained from the monitoring infrastructure interface 132 can be used to create an object of the above CIM class. Creating an object of the above J2EE_Servlet class amounts to using the functionality of the CIM Object Manager 40 to obtain an instance of J2EE_Servlet and to populate at least some of the fields in the instance, and then writing the object to the repository 50. The new instance is created with a different key set from other instances of class J2EE_Servlet already present in the repository 50. Similarly, CIM classes J2EE_EJB and J2EE_URLResource are used for Enterprise JavaBeans and Web-based resources identified by URLs.

The SQL events are modelled using the CIM_UnitOfWorkDefinition class of the CIM Metrics Model (described, at the time of writing. The specific CIM class eBIM_SQL used for modelling SQL events, which derives from class CIM_UnitOfWorkDefinition, is defined as follows:

```
class eBIM_SQL:CIM_UnitOfWorkDefinition
{
    [Key, Override("Id") ]
    string Id;
    uint64 TotalExecutions;
    real64 AvgResponseTime;
    real64 ResponseTimeOfLastExecution;
    uint64 StartTimeOfLastExecution;
    uint64 EndTimeOfLastExecution;
};
```

In the above class eBIM_SQL, "Id" is the key. Since this property is present in CIM_UnitOfWorkDefinition, we override the super class definition (as shown above). The agent that monitors the SQL information provides events to create new instances of the class eBIM_SQL. The method for creating a new instance for eBIM_SQL is the same as that described for J2EE_Servlet, including providing a unique key set for the new instance compared with instances already present in the repository 50.

In order to capture the dependency information between the above-described objects, such as for example the dependency between a servlet and an EJB, additional association classes have been defined as subclasses of the CIM_dependency class (see below). When the instances of the CIM classes pertaining to the URLs, servlets, EJBs, SQLs, and their dependencies are discovered, the CIM repository 50 in the middle layer 80 in FIG. 2 is populated with the dependencies discovered by the dependency generator. The CIM class instances are held in the CIM repository 50 in association with identifiers of the respective monitored components. The newly defined dependency classes are:

```
class eBIM_ServletExecutesSQL:CIM_Dependency
{
    [Key, Override ("Antecedent") ]
    eBIM_SQL REF Antecedent;
    [Key, Override ("Dependent") ]
    J2EE_Servlet REF Dependent;
    real32 DependencyStrength;
};
```

The above new class eBIM_ServletExecutesSQL:CIM_Dependency associates an instance of J2EE_Servlet to an instance of eBIM_SQL (i.e. t the SQL request execution resulting from processing of the servlet). The new class derives from the class "CIM_Dependency" which is present in the CORE CIM Schema. The new class has two keys: "Antecedent" and "Dependent", which are references to the corresponding antecedent SQL instance and dependent servlet instance, respectively. The property/attribute "DependencyStrength" corresponds to a measure of the consistency of identification of a dependency between the two instances, as computed by the dependency generator.

An additional subclass of CIM_dependency is the eBIM_Servlet2EJB association class whose parent superclass is J2EE_ServiceDependency. The new class eBIM_Servlet2EJB associates a servlet with an EJB. The dependent is an instance of J2EE_Servlet and the antecedent is the instance of J2EE_EJB (the JSR-77 IDE toolkit referenced above provides a definition of CIM classes with prefix "J2EE").

```
class eBIM_Servlet2EJB:J2EE_ServiceDependency
{
        [Key, Override ("Dependent") ]
        J2EE_Servlet REF Dependent;
        [Key, Override ("Antecedent") ]
        J2EE_EJB REF Antecedent;
        real32 DependencyStrength;
};
```

Similarly, additional relationships can exist between pairs of subcomponent types. The correlation engine uses the events that are sent by the agents 20 to compute the dependencies. The events are wrappers (java class objects) around the monitored data accessed by the agents.

It is well known to use a CIM framework for keeping and storing management information. The known CIM framework separates the management interface from the business interface, such that a vendor of a higher-level management application does not have to be concerned with the specific mechanism by which the management data of a product is provided to the CIM Object Manager. Such mechanisms are typically vendor-specific, and may change from one version of a product to another.

A client agent 20 polls the Web application server for performance data. Each time the client agent polls, it gets the latest values of the polled counters. If the number of requests made to a particular servlet is a required metric, each monitoring infrastructure client request returns the total number of requests made to the servlet (i.e. the number of requests within a defined time period, or from the time the client agent 20 started monitoring the Web application server 100). The client agent 20 runs on the same computer as the Web Application Server 100 and polls the Web Application Server at a regular interval of PI milliseconds. Each time the Web Application Server is polled, servlet and EJB events are generated corresponding to new requests completed for servlets and EJBs since the last poll. The generated events are sent to the Correlation Identifier of the Dependency Generator 30 within the management server 80. If the correlation identifier identifies a correlation between components, the Dependency Generator generates a new instance of the relevant subclass of the CIM_dependency class and the new dependency information is sent to the CIM repository 50.

For example, a servlet event contains:
an identifier (such as the name) for the servlet for which the event is generated,
the total number of requests made to the servlet since polling began, and
the average response time of a servlet request since the polling began.

Each servlet and EJB event also contains a time stamp that corresponds to the time of completion of the polling request (made to the Web Application Server by agent 20 in FIG. 2) that resulted in the creation of this event. If the polling frequency, 1/PI, is higher than the rate at which requests to a given servlet complete in the Web Application Server, then each servlet event that is sent would correspond to a completion of a single request to that servlet. Otherwise, servlet events are generated for multiple servlet request completions. The methods and algorithms described below for generating dependencies can handle both these eventualities. For simplicity and without loss of generality, the following description assumes that each generated event (whether for a servlet or an EJB) corresponds to a single request or method call completion.

An SQL event is sent to the management server 80 for each SQL request execution captured from a monitoring interface of the database server 110. Each event comprises an SQL query string, a time stamp that is defined to be the end time of the SQL request, and the start time of the query.

Computing Activity Periods from Events

On receiving an event, the Correlation Identifier of the Dependency Generator 30 (in FIG. 2) computes the time interval during which the request, represented by the event, is active. This interval is referred to hereafter as the "activity period" of an event. Ideally, the activity period for an event is the time interval beginning with the start time and ending with the completion time, respectively, of the request to the component represented by the event. However, when using polling-based interfaces to obtain monitoring data, the computation of the activity period is more complicated than this ideal case—as explained in the next paragraph.

Since the agents 20 poll the Web Application Server 100 via the monitoring infrastructure 130 at regular intervals of length PI, a request for the services of an EJB or servlet which request completes at some time t will only be detected at $PE_{\geq t}$, the next monitoring infrastructure polling time that happens after time t. The event corresponding to the completion of the request, which event is generated at $PE_{\geq t}$, does not include the information that the request was completed at time t but rather a time stamp $PE_{\geq t}$ is assigned to the event. Thus, the estimate of the completion time could be in error by as much as PI. For this reason the correlation identifier calculates an interval, for use as the activity period, which interval can be relied on to cover the actual activity period of the event. To compute the activity period of an event, the time stamp of the event and the execution time of the component request represented by the event are used. Since the time stamp is already an attribute of the event, the Correlation Identifier can compute the execution time of a request from the corresponding event.

If the current event corresponds to the $N+1^{th}$ request to the servlet, then $X_{N+1}$ (the execution time of the request) can be calculated by subtracting the product of the average response time $T_N$ and the total number of requests N (values of the event prior to the current one) from the product of the average response time $T_{N+1}$ and the total number of requests N+1 (values of the current event). That is:

$$X_{N+1}=(N+1)T_{N+1}-NT_N$$

For the event corresponding to the first request to the servlet, the average response time value $T_1$ is actually the execution time of the servlet request $X_1$ corresponding to that event. Similarly, the execution time of a method execution corresponding to an EJB event can also be obtained.

The 'activity period' of an event is then obtained as follows. Let the 'activity period' of the N+1$^{th}$ request be denoted as [$L_{N+1}$, $R_{N+1}$]. As mentioned earlier, the time stamp carried by a servlet-related or EJB-related event is actually the time at which the monitoring infrastructure poll request completed (i.e. the completion of the request that resulted in the creation of this event). Let the time stamp carried by the event corresponding to the N+1$^{th}$ request be denoted as $TS_{N+1}$. Define $R_{N+1}=TS_{N+1}$. The end time of the servlet request could lie anywhere in the interval [$TS_{N+1}$–PI, $TS_{N+1}$] implying that the earliest time that the request could have started is $TS_{N+1}$–PI–$X_{N+1}$. We define $L_{N+1}$ to be this earliest possible start time, i.e.:

$$L_{N+1}=TS_{N+1}-PI-X_{N+1}.$$

A small difference exists in the case of investigating dependencies of servlets on EJBs. For computing a servlet's activity period, we let:

$$L_{N+1}=TS_{N+1}-PI-X_{N+1}-PI$$

The reason for this difference is that it facilitates the containment of the activity period of an EJB, which is invoked by a servlet, into the activity period of the servlet. Such "containment" is defined below.

For some monitoring infrastructures, an assumption can validly be made that the EJB events pertaining to the EJB method calls made during a servlet request are generated no later than the servlet event pertaining to the completion of the servlet request.

Figure 3:
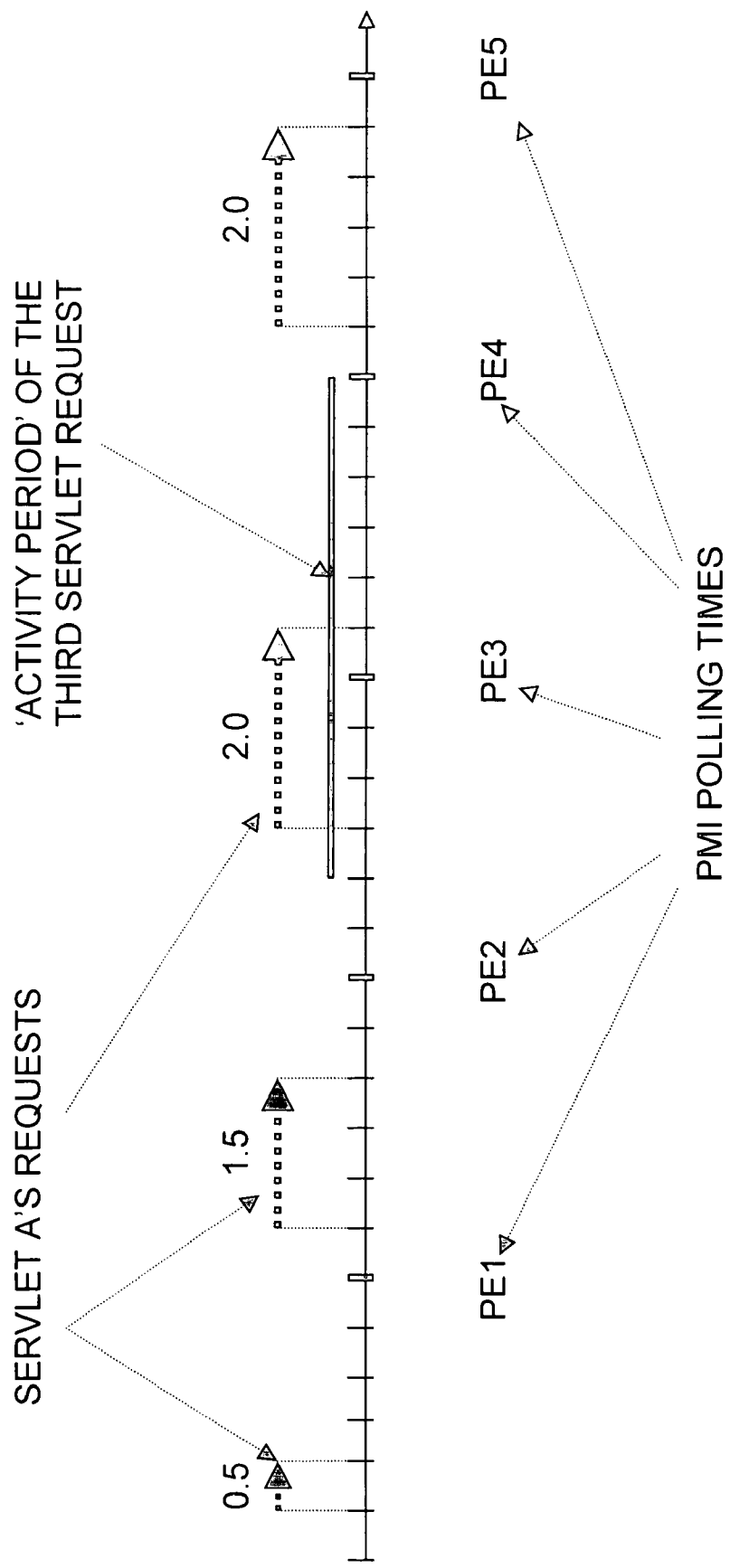
FIG. 3 shows an exemplary timeline of request execution for a servlet of a Web application server, a set of polling times and an example computed 'activity period'.

FIG. 3 shows an example timeline of the execution of requests to a servlet, referred to hereafter as servlet A, in a Web Application Server (WAS). The time 0 on the line can be taken to be the time at which monitoring by a Performance Monitoring Infrastructure (PMI) 130 is enabled in the Web Application Server. The first 15 time units after the PMI enablement are shown. During this time, four requests to servlet A have occurred. These requests are shown above the timeline in FIG. 3. The execution period of each request to servlet A is depicted as a dotted horizontal line that ends in an arrow and with the execution time of the request shown above the line. For example, the first request starts at time 0.5 and finishes at time 1, lasting for a total of 0.5 time units. A PMI client, which is enabled at time 0, polls the Web Application Server at a regular interval of 3 time units, i.e., PI=3. For example, the first polling time, PE1, is at time 3, the second time, PE2, at time 6, and so on. The PMI client agent polls the Web Application Server for the current values of two counters (maintained internally by WAS) pertaining to Servlet A, namely N and $T_N$, both initialized to 0 after the Performance Monitoring Infrastructure is enabled on the Web Application Server.

Let us assume that the polling rate is sufficiently high that, between two successive polls, at most one request to servlet A can complete. The counter N corresponds to the total number of requests to servlet A that have completed since the polling began (i.e., since time 0). The counter $T_N$ records for servlet A the average execution time of a request to the servlet. After each new request to servlet A, the value of the counter N and $T_N$ are updated by the Web Application Server. The retrieved values of the counters N and $T_N$ at the end of each of the polling times (PE1, PE2, PE3, PE4, and PE5) are catalogued in the table shown below the timeline in FIG. 3. The determination of the execution time $X_N$ of each request from N and TN values is described above. The third request to the servlet finishes only after the poll PE3 is complete. Thus PE3 returns the values of counters that existed at the end of PE2.

At the end of each poll the PMI client agent generates events for servlet A. These events are sent to the management clients 60 (see FIG. 2). No event is sent after the completion of poll PE3 because no servlet request has completed during the interval [6, 9] between PE2 and PE3, and hence there has been no change in the counter values. Thus, only when the corresponding counter values change are any servlet or EJB events generated. For example, just after time PE1 a servlet event will be generated that will carry the following fields: (1) an identifier for the servlet, which in this case is 'A', (2) time stamp TS1, which in this case is '3', (3) the retrieved value of counter N, which in this case is '1', and (4) the retrieved value of the counter TN, which in this case is '0.5'. Likewise, a servlet event is generated just after each of the remaining times PE2, PE4, and PE5. The third event, generated just after time PE4 and having time stamp TS3=12, corresponds to the third servlet request having execution time X3=2.0. It is desired to calculate the 'activity period' corresponding to this request. The request ends at time 9.5, but this time is not known. Instead, the timestamp TS3 of the event is known, and from this it is possible to determine the time interval in which the request has completed which is [TS3–PI, TS3] or [9, 12]. The covering interval or 'activity period' of the request is then [TS3–PI–X3, TS3] or [7, 12]. Table 1 below shows the request counter value N, average response times $T_N$, execution times $X_N$ and event time stamps $TS_N$ for a number of polling times as shown in FIG. 3.

TABLE 1

|  | PE1(=3) | PE2(=6) | PE3(=9) | PE4(=12) | PE5(=15) |
|---|---|---|---|---|---|
| N | 1 | 2 | 2 | 3 | 4 |
| $T_N$ | 0.5 | 1.0 | 1.0 | 4/3 | 6/4 |
| $X_N$ | 0.5 | 1.5 | — | 2.0 | 2.0 |
| $TS_N$ | 3 | 6 | — | 12 | 15 |

In the case of SQL events, as opposed to the servlet and EJB events, the start and end time of every SQL request is known. Therefore, it is possible to determine the 'activity period' of each SQL request precisely, as:

[start time of request, end time of request].

An existing database monitoring interface can be used instead of Java Database Connectivity (JDBC) instrumentation, and yet it remains possible to obtain SQL information to construct such exact activity periods for SQL requests.

Whether a servlet, EJB, or an SQL event, references herein to the end time or start time of an event mean the end time or start time, respectively, of the activity period represented by the event. Every event carries a time stamp that equals the end time of the activity period that the event represents.

Dependency Extraction

A method and algorithn for extracting dependency relationships from monitoring data is now described. Also described is a problem-determination application's solution to falsely-identified dependencies.

In the description below, services and components that depend on other services or components are referred to as 'dependents'. Services and components on which other services or components depend are termed 'antecedents'. In the dependency graph model of the distributed system, each resource or component is represented as a node and a dependency between nodes is represented as a directed edge or link. Attributes are maintained for each node to capture its runtime status. Weightings are calculated at run-time for the identified dependency relationships represented by edges.

Dependency Definitions

Consider any two components, such as a servlet A and an EJB B for example. In the general case, A is said to be dependent on B if B's services are required for A to complete its own service. A weight may also be attached to the directed edge from A to B. Weightings may be interpreted in various ways, but in this specific implementation weightings are a quantitative measure of the extent to which A depends on B (i.e. a measure of the extent to which A may be affected by unavailability or poor performance of B). Any true dependency between A and B arises from an invocation of B from A, which may be synchronous or asynchronous. The example method described below handles synchronous invocations only but alternative embodiments, such as those identifying correlations between the numbers of component invocations instead of contained activity periods, may handle asynchronous invocations.

An activity period [b1, b2] of the component B is said to be contained in an activity period [a1, a2] of the component A if $a1 \leq b1$ and $b2 \leq a2$. As mentioned above, the activity periods of a component are assumed to have a one-to-one correspondence to the service request start and completions for that component, for simplicity. Therefore, for each service request completion for a component, the component's activity period can be computed from the corresponding event received at the Correlation Identifier (in FIG. 2). If there is determined to be a 'probability' p that a given activity period of A contains an activity period of B, the definition of dependency between the two components A and B is as follows:

A depends on B with probability p (or $A \xrightarrow{p} \rightarrow B$)

The above definition of containment of an activity period into another period captures the following dependency type:

A invokes the services of B, directly or indirectly, and A finishes only after the invocation of B returns. An example of A invoking B directly is: A calls a method of B and waits for the call to return. On the other hand, A invokes B indirectly if A directly invokes some component C, which in turn can either directly or indirectly (a recursive definition) invoke B.

A dependency of the above type is called a true dependency. Any other type of dependency that is captured by our dependency definition is called a false dependency. A motivation for the definition for p given above is that the number p comes very close to the probability that a given execution of A invokes, directly or indirectly and at least once, the component B, and finishes only after the invocation to B returns.

If A calls B's methods on each request to A then, according to the above definition, p is 1.0. If only 20% of the requests to A result in calls to B then p is 0.2. Multiple calls or containment of activity periods of B per request to A are counted as a single call to B.

Figure 4:
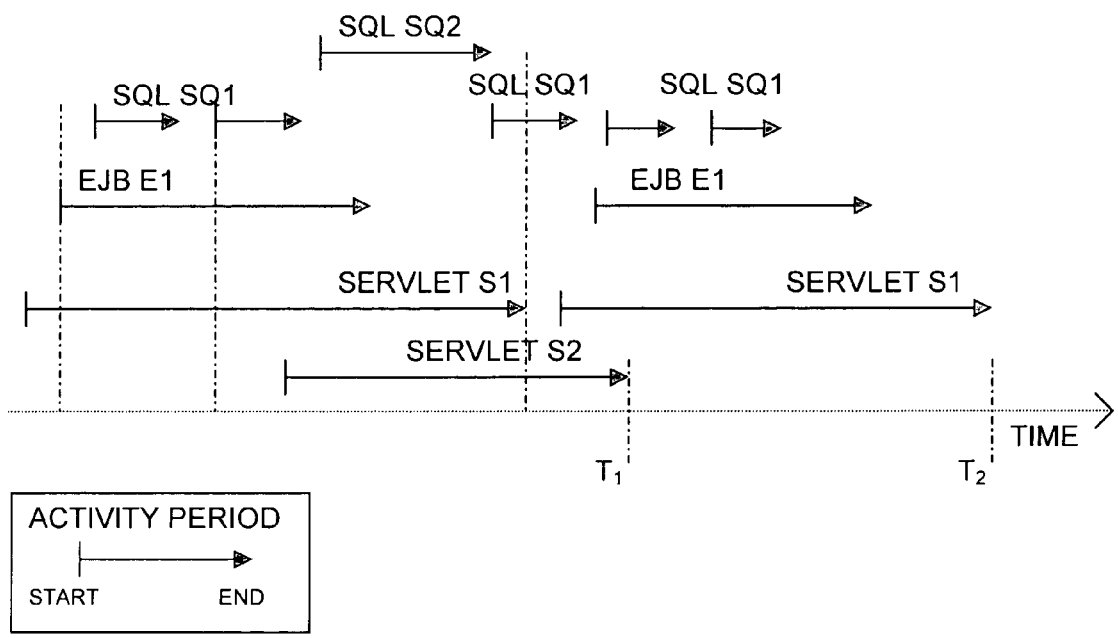
FIG. 4 shows an exemplary timeline including overlapping activity periods for a set of servlets, SQL request executions and EJB executions.
Figure 4:
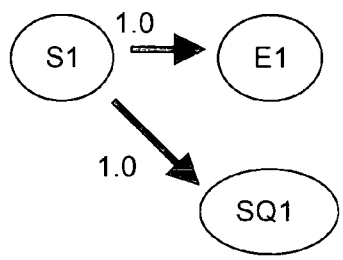

FIG. 4 shows an example of the containment relationship between activity periods of antecedents and dependents, capturing the notion of true dependencies and false ones. During each invocation of Servlet S1, S1 invokes EJB E1, which in turn invokes SQL SQ1 twice. Furthermore, during each invocation of Servlet S2, S2 invokes SQL SQ2, followed by SQL SQ1. In FIG. 4, where time flows from left to right, two executions of S1 and one execution of S2 are shown. For each execution of a component, a solid horizontal line (ending in an arrow head) represents the activity period associated with the execution. For example, the lowermost solid line is the activity period of Servlet S2's only execution shown in FIG. 4. Since the activity periods of SQL SQ1 are contained in the activity period of EJB E1, and the activity period of EJB E1 is contained in Servlet S1, the following dependencies are identifiable: S1→SQ1, E1→SQ1, and S1→E1, all of which are true dependencies. Since the activity period of SQ2 (an SQL event) is also contained in Servlet S1's activity period, the following dependency is also identified: S1→SQ2. This apparent dependency is a false dependency.

Similarly, the dependencies of Servlet S2 are S2→SQ2 and S2→SQ1, both of which are true dependencies. The dependency definition presented above assumes, for simplicity, a synchronous invocation model where A does not finish executing until all its invocations of B return.

A method (and an algorithmic representation of the method) is presented below for computing the dependencies for any given component, based on the definition above. The true dependencies for the given component include all the components that are directly and indirectly invoked by the given component. The method can also be expected to compute 'false' dependencies.

Referring to FIG. 5, a two-level dependency graph may be generated using the above definition of a dependency, which graph has a node at level one with all its true and false dependencies situated at the second level. FIG. 5 shows a two-level dependency graph for Servlet S1 of FIG. 4. Looking at only the two-level graph of a component suffices because all the components on which the current monitored component is dependent (i.e. the antecedent nodes) are captured at the second level of the graph, and there is no need to traverse the two-level graphs of any of the antecedent nodes. Furthermore, the transitive property of dependencies may not hold in general, and so a two-level graph helps to consider only the true dependencies of a component.

Figure 5A:
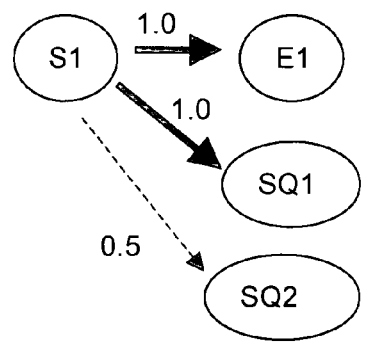
FIG. 5 show two-level dependency graphs for a servlet (corresponding to servlet S1 of FIG. 4), with FIG. 5A showing true dependencies only and FIG. 5B including true and false identified dependencies.
Figure 5B:

Referring to FIGS. 4 and 5 and the dependency relationships of servlet S1, S1 invokes EJB E1 each time the servlet S1 is active, and EJB E1 in turn executes SQL SQ1 twice. A directed edge from S1 to E1, for example, states that S1 depends on E1; and the edge label is an empirical value representing the 'likelihood' that a dependency relationship exists (the value of p for this dependency). In FIG. 5A, the true dependencies of servlet S1 include the antecedents EJB E1 and the SQL SQ1. The edge label for the dependency S1→E1 is 1.0 because the proportion of the activity periods of S1 that contain at least one activity period of E1 is 1.0 (for the current monitoring period). In FIG. 5B, the servlet S1 does not execute SQL SQ2, but SQ2 occurs in the set of dependencies for S1 due to false containment.

The calculated 'probability' value, p, in $A \xrightarrow{p} \rightarrow B$ (referred to hereafter as the 'p-value') depends on the business logic in A and the workload applied to the enterprise environment containing the component A. If the logic and the workload change, the p-value may also change. Assuming that the logic and the workload do not vary with time, the Correlation Identifier 30 (see FIG. 2) estimates the p-value from event traces. From the definition of the p-value given above and the event traces received for both A and B, the p-value is determined by calculating the proportion of the activity periods of A that contain at least one activity period of B. That is, let #A denote the total number of activity periods of A seen so far, and #(B, A) denote the total number of activity periods out of #A that contain at least one activity period of B. Then the number #(B, A)/#A is an estimate of the p-value. As new events are received at the CIM repository 50 (see FIG. 2) the method generates and updates the dependency graph automatically.

Dependency Extraction Method and Algorithm

A dependency extraction method and algorithm are presented herein informally, referring to servlet and SQL events by way of example only (without any intended limitation).

Let $\Sigma_{sq1}$ denote the set of all SQLs and $\Sigma_{servlet}$ denote the set of all servlets in a given Web application. Let $A \in \Sigma_{servlet}$. The method sets out to discover and update all dependencies $A \xrightarrow{p} B$, where $B \in \Sigma_{sq1}$.

A property that the method uses (which property can be assumed to be satisfied by the system of FIG. 2) is that the events from a given component (say servlet A) are received at the Correlation Identifier in the increasing order of their time stamps. As noted previously, the time stamp of an event is defined as the end time of the activity period represented by the event. This also implies that SQL events received at the Correlation Identifier are in the increasing order of their time stamps.

Some definitions are presented here, to enable interpretation of the algorithmic representation of the method.

A servlet event is said to be fully processed if all the SQL events that have their activity period contained in the activity period of the servlet event have been identified; otherwise the servlet event is said to be partially processed. The following event lists are maintained in the CIM repository:

antecedentList comprises events received for SQLs in $\Sigma_{sq1}$,
dependentList comprises events received for the servlet A, and
dependencyList maintains the list of dependencies of A that are obtained so far.

The dependencyList variable keeps the list of all those SQLs in $\Sigma_{sq1}$ for which dependencies have been detected so far.

LPP is defined as an event pointer that at any time holds reference to the currently lowest time stamped partially processed event in dependentList.

HSQ is defined as an event pointer that at any time holds reference to the currently highest time-stamped event in antecedentList subject to its time stamp being less than or equal to the time stamp of the servlet event referenced by LPP. Both LPP and HSQ are initialized to null.

A counter #A (initialized to zero) keeps the count of the number of fully processed servlet A events so far.

For each SQL B in the dependencyList, a counter #(B, A) is set (after being initialized to 1). The counter counts the number of servlet A events so far that contain at least one SQL B event.

For any event pointer e the notation 'e.id', 'e.timestamp', 'e.starttime', 'e.next', and 'e.prev', respectively, refer to the following attributes of the event referenced by e in an event list: the identifier (id), the time stamp (timestamp), start time (starttime), reference to the event immediately after the event referenced by e (next), and reference to the event immediately before the event referenced by e (prev).

The dependency extraction algorithm is presented below in a pseudo-code form. Based on the type (servlet or SQL) of the next event E receives, the following tasks are performed:

Main Algorithm

```
1. E of type servlet event:
    a. Add E to the end of dependentList
    b. if LPP is null then
        i. set LPP to E
        ii. increment #A by 1.
        iii. computeHSQ( ), return,
    c. else /* LPP is not null */
        i. if HSQ is null then return
        ii. if HSQ.next or LPP.next is null then return,
        else set LPP to LPP.next, increment #A by 1,
            updateDependencies( ), computeHSQ( ), goto 1.c.ii
2. E of type SQL event:
    a. Add E to the end of antecedentList
    b. if LPP is null then return
    c. computeHSQ( )
    d. if HSQ.next or LPP.next is null then return,
        else set LPP to LPP.next, increment #A by 1,
        updateDependencies( ), goto 2.c
```

The main algorithm above includes the following subroutines:

```
computeHSQ( )
1. if antecedentList is empty then return,
    else set tempList to antecedentList if HSQ is null or to the
    portion of the event list after HSQ (i.e., those SQL events
    that have time stamps greater than or equal to the
    HSQ.timestamp)
2. while there is a next event to process in tempList
    a. set temp to the next event in tempList
    b. if temp.timestamp > LPP.timestamp then return
    c. checkContainment(LPP, temp), HSQ = temp
3. return
updateDependencies( )
1. tempHSQ = HSQ
2. if tempHSQ.timestamp < LPP.starttime then return
3. checkContainment(LPP, tempHSQ), goto 2
checkContainment(depEvent, antEvent)
1. if depEvent.timestamp ≧ antEvent.timestamp and
    depEvent.starttime ≦ antEvent.starttime then add antEvent.id
    to dependencyList if not already done, increment by 1 the
    counter #(antEvent.id, A), corresponding to dependency
    A→antEvent.id,
2. return
```

The main algorithm shown above preserves the following properties:

all servlet events in the dependentList having time stamps less than LPP.timestamp are fully processed and the rest are partially processed, and HSQ always points to the highest time stamped SQL event, currently in the antecedentList, having timestamp less than or equal to LPP.timestamp.

In the non-boundary case (i.e. when both LPP and HSQ are not null), on an arrival of an SQL event with time stamp less than LPP.timestamp, HSQ is set to this event; otherwise LPP is set to LPP.next (i.e. to the next servlet event, whenever it becomes available) and the count #A is incremented by one. In the latter case, the method continues to scan the SQL events earlier than the event pointed to by HSQ until an SQL event is reached which has an end time earlier than the start time of the new servlet event pointed to by LPP; thereafter the method scans the later SQL events to compute the new value for HSQ. Each time an SQL event is compared with the servlet event pointed to by the LPP, the method also checks for containment of the activity period of the SQL event within the servlet event, updating the dependencyList and corresponding frequency counts if required. This process is repeated with the new LPP and HSQ. The method outputs estimates of p-values by computing for each SQL B in the dependencyList the number #(B, A)/#A.

The above dependency extraction method has a desirable property that the number of event comparisons needed in order to ascertain all the probable dependencies is relatively low. If n is the number of activity periods contained in a given activity period, the number of event comparisons required to determine the set of probable dependencies is a linear function of n, represented as O(n).

Problem Determination using Probabilistic Graph

As discussed above, a dependency graph may be used to identify the root cause of a problem, which is visible at a high level, such as an end-user response time violation of a client transaction. It is assumed that the node state can be examined and a determination made at run-time of whether the node has a problem, and the assumption is valid for response-time related problems. A problem at a node will manifest itself in its parent nodes and thus appears as a end-user problem or Service Level Agreement (SLA) violation. A systematic top-down traversal of a graph is performed to visit the nodes in some order until a node is reached which shows a problem by its state, but whose children do not have a problem. For example, if it is observed that a particular URL's response time is higher than usual (a possible SLA violation), then a component dependency graph may be used to identify whether the problem lies in the servlet code (that services the URL) or in any of the EJBs or SQLs called by the servlet.

Root cause analysis using dependency graphs is described in a number of references including the paper by B. Grushke "Integrated Event Management: Event Correlation Using Dependency Graphs" (DSOM '98, referenced above). In a simple root cause analysis, a depth-first or breadth-first traversal of the graph can be performed to identify such nodes. The edge weights may or may not be used in deciding the traversal order. The following paragraph describes how dependency edge weights may be used to decide the traversal order of edges in the two-level graph of a component.

The presence of false dependency edges in a two-level graph complicates the traversal problem. The edge weights represent the computed "likelihood" of A depending on B. False dependencies may be identified from containment of activity periods due to concurrency of transactions flowing through the components of the server. Additionally, there may be certain components that tend to be active at the same time without a true dependency relationship. For example, a significant percentage of users may choose to invoke "search" immediately after going to the "main page" of a site. Therefore, it is likely that the activity periods of some of the components invoked by the servlet servicing the main page request will overlap with some invocations of the servlet servicing the search request, and vice versa. This may result in detection of false dependencies (based on the above definition) for both servlets.

Clearly, traversal of false dependencies reduces the performance of a Problem Determination algorithm and increases the Mean Time To Recovery.

In order to optimize the search from any node A to its root causes, the dependencies of A in its two-level graph are sorted into a decreasing order of the p-value. This decreases the likelihood of having to investigate an antecedent node that is actually a false dependency, based on the premise that most of the true dependencies will precede the false ones in the traversal order. If A's problem is due to a component on which it depends, then as the dependencies of A are investigated (in the descending order of the p-value), the Problem Determination application stops when it encounters a problem component. This should avoid the Problem Determination application continuing to process all identified dependencies including false ones.

However, the specific workload of the monitored system may be such that the empirical probability of a false dependency can be higher than that of a true dependency. For instance, A may have a true dependency on B, but if A invokes B only 5% of the times that A is active, then p is 0.05 and a false dependency could have a higher p-value. In order to further decrease the likelihood of having to look at false dependencies during problem determination, another statistic can be used as described below.

Improved Traversal Order for Problem Determination Applications

Additional statistics and heuristic transformations of the basic 'probability' values may be used by a Problem Determination application to avoid investigating false dependencies during root cause analysis. In particular, a "reverse probability" of a dependency A→B, called the r-value, may be used. Both the p-value and the r-value are used together to sort the dependencies in the two-level graph of a node so that the likelihood of a true dependency being higher in the sorted list is more than simply sorting based on only the p-value.

Conceptually speaking, the r-value is similar to the definition of p-value. We define the r-value as the probability that a given activity period of the component B is contained in an activity period of the component A, where the definition of containment is as described earlier. We estimate the r-value as follows. Let, $(\phi(A, B)$ denote the number of activity periods of B, seen so far, which were found to be contained in at least one activity period of A. Finally, let #B be the total number of activity periods of B seen so far. We take the number p(A, B)/#B as an estimate of r-value. To see the difference between p-value and r-value, consider the earlier example in which A invokes B only 5% of the time A is active. Suppose A is the only component that invokes B in the application, then the p-value will be close to 0.05 whereas the r-value will be close to 1.0. Another illustration of the difference between p and r-values is given in Table 1. The algorithm for computing p-values given above can be tailored to compute the r-values as well.

We then sort the dependencies at node A in the non-increasing order of:

$$\max(p,r)+pr$$

This heuristic uses the two statistics to effectively transform the weights (or computed probabilities) of all dependencies of a node. The dependencies of a node are then sorted in non-increasing order of these new weights. The rationale for choosing the heuristic is the following. The first term coarsely sorts the dependencies of a node so that edges with high p- or high r-values are catapulted up in the order. A dependency is more likely to be true if at least one of these is high. The product term, pr, performs finer grain sorting among equals. A dependency is more likely to be true if both p- and r-values are high compared to the case when only one of the values is high.

However, the heuristic 'max(p, r)+pr' penalizes the true dependencies which have low p- and r-values. For example, if a servlet X executes an SQL Y rarely, but the SQL Y is frequently executed by some other servlets in an application, then the dependency Y of X will appear lower down in the sorted list of dependencies of X, because both p and r values will be small. However, there is an increased likelihood that if the problem in X is due to Y, then other servlets that more frequently call Y also have the same problem and we are able to identify Y through one these servlets.

Other such heuristics may be used to transform the basic weight values in a system-specific Problem Determination application. The presence of false dependencies can be coped with at the management application level.

Table 2 below shows the p- and r-values of some of the dependencies of Servlets S1 and S2, in the example in FIG. 4, at two polling times T1 and T2. Note that by time T1 only two requests—one from S1 and one from S2—have completed; and by time T2, two requests from S1 and one request from S2 have completed.

TABLE 2

| Polling times | Dependencies with their p- and r-values | | | | | | | |
|---|---|---|---|---|---|---|---|---|
| | S1 -> SQ1 | | S1 -> SQ2 | | S2 -> SQ1 | | S2 -> SQ2 | |
| | p | r | p | R | p | r | p | r |
| T1 | 1.0 | ⅔ | 1.0 | 1.0 | 1.0 | ⅓ | 1.0 | 1.0 |
| T2 | ⅘ | ½ | 1.0 | 1.0 | 1.0 | ⅕ | 1.0 | 1.0 |

Described below is an experimental evaluation which shows positive results for the above-described heuristic, max (p,r)+pr, for a benchmark application. The pathological case described above occurs only infrequently.

Experimental Evaluation

The dependency algorithm described above has been evaluated experimentally. The test system setup is described below, followed by measurements for accuracy, precision, and overhead of the algorithm.

The test system comprises three machines, such as represented in FIG. 2. IBM Corporation's WebSphere Application Server v4.0 software (Web application server 100) and DB2 v7.1 software (database server 110) are installed on a first computer (2 GHz processor, 1 GB memory) at layer 70 of FIG. 2. A second computer (600 MHz processor, 512 MB memory—also at layer 2) is used to run a browser emulator or TPC-W request generator 140 (see below) and send URL requests to the first computer. The first computer also runs an HTTP server. A third computer (2 GHz, 1 GB) at layer 80 in FIG. 2 runs a CIM Object Manager 40 and the dependency generator 30 which includes the correlation identifier. The computers are connected over a 100 Mbps Ethernet connection.

The test system uses the known TPC-W bookstore application from University of Wisconsin as a benchmark application for evaluating the algorithm. (TPC-W is selected because the application has a sufficient number of dependencies for preliminary investigation purposes, without having a complicated program structure. Furthermore, TPC-W is easy to instrument and enables easy comparison between results achieved using the above-described algorithm and ideal results. The simplicity in structure and presence of only servlet-to-SQL dependencies facilitates analysis and debugging the mining-based approach. Although the above-described algorithm can tackle dependencies involving EJBs, there are no EJBs in the TPC-W application.) The University of Wisconsin's TPC-W application implementation is written in the Java(™) programming language and comprises 14 servlets, 46 SQL servlets and a database of 10,000 books. At the time of writing.

TPC-W provides three types of Web communication traffic mixes, as follows:

MIX1: 20% browse and 80% buy;
MIX2: 80% browse and 20% buy; and
MIX3: 50% buy and 50% browse.

Unless otherwise specified, MIX3 is used in the experiments described below, for larger graph coverage within a given time period. The experiments involve applying the methods described above to discover the dependencies between servlets and SQLs. In the test system, there are 54 true servlet-to-SQL dependencies out of potential set of 644 dependencies.

Accuracy is defined as the percentage of the true dependencies discovered. If 54 true dependencies can be discovered during the experiments, then the accuracy is 100%.

Precision is defined based on the improved two-level graph traversal order described above (under the subtitle "Improved Traversal Order for Problem Determination Applications"). In the sorted dependency list of a node having n edges, the edges are numbered (starting from the first edge) from 1 to n with m (m≦n) being the last true dependency in the list. We assign a weight of m-i to the dependency labelled i, where $1 \leq i \leq m-1$. The sum of the total weights from 1 to m-1 is therefore:

$w_{tot} := m(m-1)/2.$

The contribution of weight coming from false dependencies, from the total $w_{tot}$, is defined as:

$$w_f := \sum_{i < m, i \text{ is a false Dependency}} (m - i)$$

Percentage node-precision is defined as: $100 (1-(w_f/w_{tot}))$

The above definition of the Percentage node-precision penalizes a false dependency more if the false dependency occurs higher in the list. The precision value reported in the following experiments is the mean percentage node-precision over the 14 servlets.

Accuracy and precision are measured on the test system as follows. The TPC-W application is instrumented with a transaction correlation program to find the actual set of the dependencies that should be discovered at each point in time as user transactions flow through the system. Thus accuracy and precision can be computed at each time point by comparing the dependency information generated by the above-described dependency algorithm with information generated in the same experiment by the instrumented transaction correlation program.

Figure 7A:
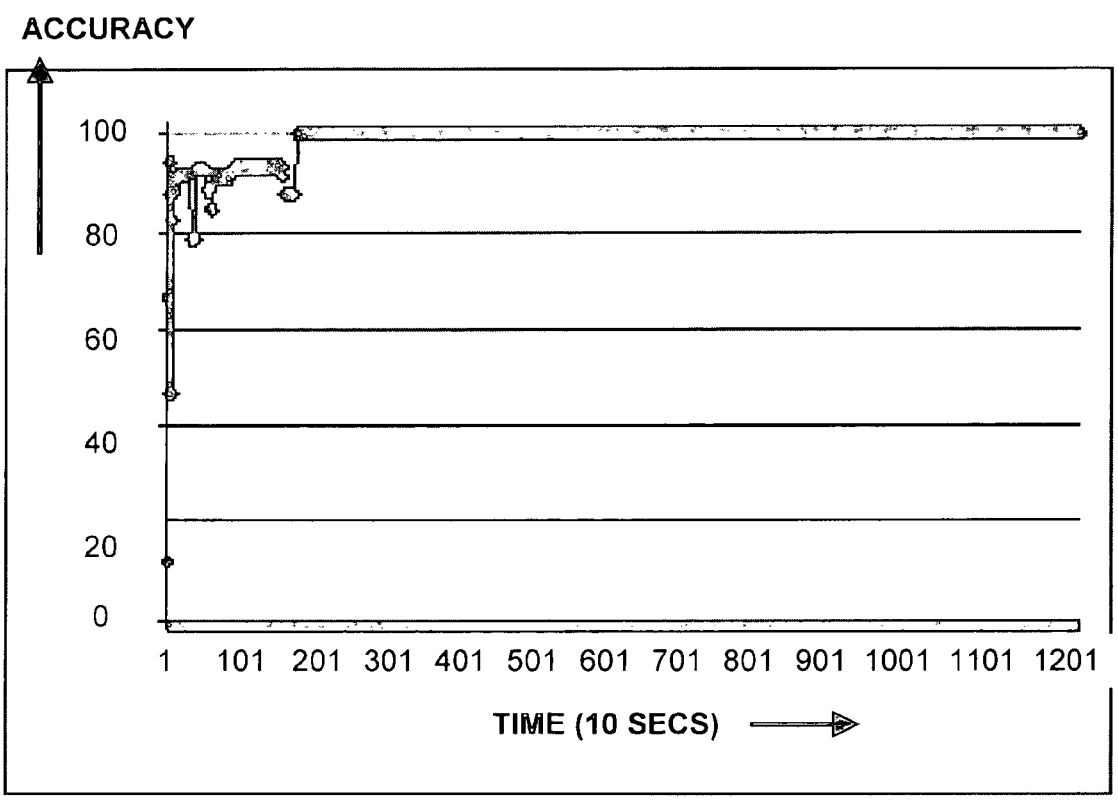
FIG. 7A is a graphical representation of experimental results for the variation of 'accuracy' of dependency determination with time for a test system.
Figure 7B:
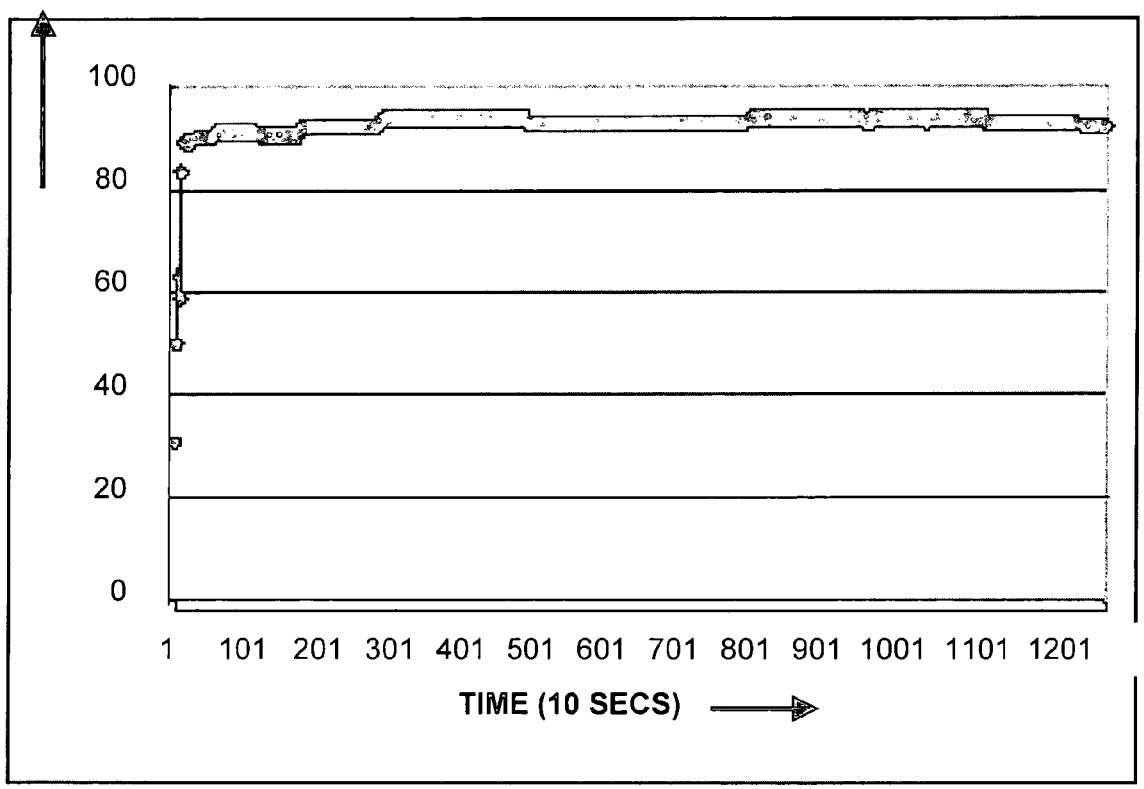
FIG. 7B is a graphical representation of experimental results for the variation of 'precision' of dependency determination with time for a test system.

FIGS. 7A-B illustrates accuracy and precision results for an experiment run with 50 simultaneous customers. In FIGS. 7A-B, the variation of (A) Accuracy and (B) Mean Precision with time are each represented for a particular load of 50 customers. The accuracy and precision values stabilized over time (as shown in the FIGS. 7A-B). The accuracy and precision values remain stable with the workload, and so the computed graph can be used for long stable periods. It can be observed that the method was determined to be 100% accurate (FIG. 7A), whereas precision stabilizes to around 98% (FIG.). The convergence time is within a few minutes and closely tracks workload stabilization.

Accuracy and Precision for TPC-W Bookstore Application

A factor which may significantly impact the performance of the dependency algorithm is the degree of concurrency in the system. If multiple transactions proceed simultaneously, difficulties arise when trying to separate true dependencies from false dependencies using containment relationships.

The degree of concurrency of transactions on a Web Application Server may be increased by increasing the number of simultaneous customers or Web Browser emulators, thus keeping more threads in the available thread pool simultaneously active. The Web Application Server is configured to fork threads on demand with a minimum of 25 pre-forked threads. As customer load is increased, the number of simultaneously active threads grows, and the thread pool size is also automatically increased by the system beyond 25 if needed.

Table 3 shows the variation of accuracy and precision values with increasing customer load and concurrency (for traffic MIX3). The number of customers is increased until a significant percentage of URL requests timed out due to high workload. The Web Application Server machine used in the experiment was able to support up to 200 customers and so the experiments have been run up to 200 customers as a high load case. At 200 customers load-level, the client emulator which sends requests to the application program via the Web application server generates around 450-500 requests per minute. Each experiment was run for one-hour duration. It is likely that precision values could be increased by running experiments for longer periods.

TABLE 3

| Load: # Customers | #Avg active threads (Avg thread pool size) | Mean Precision % (std dev σ) | Accuracy % |
| --- | --- | --- | --- |
| 5 | 2.2 (25.0) | 100 (0) | 100 |
| 25 | 3.5 (25.0) | 99.94 (0.22) | 100 |
| 50 | 4.6 (25.0) | 98.33 (3.12) | 100 |
| 100 | 10.6 (25.0) | 81.86 (21.00) | 100 |
| 150 | 17.1 (26.4) | 71.52 (32.43) | 100 |
| 200 | 20.0 (31.9) | 62.62 (26.82) | 100 |

Table 4 shows the effect of the Performance Monitoring Infrastructure polling rate on precision and accuracy with a fixed load of 100 customers. The results in Table 4 show precision to be more sensitive to polling rate than accuracy. At lower polling rates, even though accuracy is 100% and the management overhead reduces, the precision also reduces. At higher load, a high polling rate is required to maintain high precision, but the overhead is also increased and such increases are undesirable at high load.

TABLE 4

| Polling interval (milliseconds) | Mean Precision % (std dev σ) | Accuracy % |
| --- | --- | --- |
| 50 | 88.71 (18.75) | 100 |
| 100 | 81.86 (21.00) | 100 |
| 500 | 71.03 (29.82) | 100 |

The algorithm results showed 100% accuracy under all loads. Precision values decrease with increasing load. The standard deviation (v) for precision is low at low loads but rises at higher loads. Dependency extraction can be performed at low to medium loads and stopped, if the precision level of the graph is to be maintained. The operating load range of the algorithm may be determined by the acceptable level of precision, which may be objectively decided by the acceptable latency in computing the root cause of a problem. A lower precision typically leads to a higher latency in root cause computation.

Table 4 shows the variation of accuracy and precision at a fixed load of 100 customers by varying the Performance Monitoring Infrastructure (PMI) polling rate. A higher polling rate leads to increased management overheads. Table 5 shows preliminary overhead measurements, in terms of percentage increases in transaction response time and throughput, when dependency extraction is active, by varying the customer load and PMI polling interval. Each reading corresponds to an experiment run for 3 hours.

TABLE 5

| | Polling Interval (milliseconds) | | | |
| --- | --- | --- | --- | --- |
| | 100 | | 500 | |
| Simultaneous Customers | Throughput (%) | Response Time (%) | Throughput (%) | Response Time (%) |
| 10 | 2 | 10 | 0 | 3 |
| 200 | 9 | 33 | 8 | 25 |

The embodiments of the invention described in detail above enable discovery of dependencies between system components using non-intrusive techniques. A system and method according to one embodiment of the invention can discover dependencies between any two monitored components in a managed system without any changes or modifications to the existing source code or executables comprising the managed system. The dependencies are constructed using only the data accessible from the managed system, such as logs and performance metrics, and this data is retrieved from the managed system by agents that poll the managed system for changes in state, or subscribe to events from the system.

The amount of manipulation of monitoring data performed by a monitoring agent depends on the specific implementation of the invention. If an agent is running on the same CPU as the monitored system, any computation by the agent imposes a processing overhead on the CPU. However, if the agent runs on a different CPU from the correlation identifier, network communication overhead is imposed by the sending of events from the agent to the management server running the correlation identifier. One embodiment balances these factors by the agent performing aggregation, such as averaging, and batching events to reduce network overhead. Alternative trade-offs between the processing overhead of the CPU of the monitored system and network communication overheads may be implemented by varying the amount of processing performed by the agents, the correlation identifier and the dependency aggregator.

According to the embodiment, a dependency generator identifies correlations between the run-time activity of logical components and uses the correlation results to generate estimates of the dependencies between the monitored components. The run-time activity data may include the number of requests made to a monitored component, the average response time of a monitored component so far, or other activity metrics. One dependency generation method requires an estimate of only the activity periods of the two components under consideration—which activity periods are estimated from the monitored run-time activity data. A 'probability' of a dependency is estimated from the consistency with which the monitoring data shows a positive correlation between components and, in some cases, also by reference to the attributes of the components. This estimate is updated as and when new data becomes available. The dependency extraction method does not rely on any specific measure of the probability of a dependency between components.

The computed 'probability' value, representing the consistency of identification of a positive correlation between a first component and a second component, can be updated from a Current Estimate value to a New Estimate value according to the result of comparing the run-time activity data of the first and second component for each execution of the components. In one embodiment, this update is in accordance with the rule:

NewEstimate=CurrentEstimate+StepSize[Target−CurrentEstimate]

where StepSize is the inverse of the total number of executions of the second component and Target is 1 if the comparison of the run-time activity data of the first and second component for the current execution results in a positive identification of a dependency relationship, and 0 otherwise.

One example statistic for estimating a 'probability' of dependency is the p-value (described above). Alternatively, a function of the two statistics r-value and p-value together can be used as a measure of the 'probability' of the dependency.

The update procedure for the p-value for a dependency is of the form:

NewEstimate=CurrentEstimate+StepSize[Target−CurrentEstimate], where StepSize is the inverse of the total number of activity periods of the antecedent component and Target is a function of the activity periods of the antecedent and the dependent in the preferred embodiment. Target is I if the antecedent's activity period is contained in the activity period of the dependent in the preferred embodiment, otherwise the Target is 0. A similar update procedure can be applied to the r-value, except that the StepSize is then the inverse of the total number of activity periods of the dependent component.

The dependency results may be used by a number of different systems management applications such as visualization, root cause analysis for problem determination or impact analysis such as for determining the effects of taking system components off-line (for maintenance or upgrades). Containment of computed activity periods for logical components has been found to provide a good basis for discovering dependencies between synchronous components of a distributed system, but the method may also discover false dependencies. To reduce the likelihood of a problem determination application investigating false dependencies, a sorting heuristic may be used to increase the probability of true dependencies appearing high in a sorted list. Such sorting methods may use attributes such as the frequency of invocation of a component, or attach higher significance to apparent dependencies discovered when the monitored system is under light load conditions. In particular, a higher weightings can be applied to dependency results discovered when a small number of processes are running concurrently in the monitored system, or results discovered during high load conditions may be filtered out.

Alternative embodiments of the invention discover correlations between run-time activity metrics other than activity period containment to determine probable dependencies—such as discovering correlations between the frequency of execution of the components or the average execution period of the components. If there is a correlation between increases or decreases of average execution period for two components, and those increases or decreases are not explained by increasing or decreasing load, then it is likely that the two components are dependent on each other or share a dependency relationship with another component or resource.

Methods according to the invention may include a consideration of which of the identified dependency relationships are sufficiently consistently identified to be reported as dependencies. Weightings may be determined by combining the results of correlation comparisons for a plurality of different run-time activity characteristics and used to sort the dependencies in order, or computed 'probability' values may be compared with a minimum threshold value.

As will be understood by persons skilled in the art, additional modifications or additions may be made to the specific methods, apparatus and computer programs described in detail above without departing from the scope of the invention as set out in the claims.

The invention claimed is:

1. A method, implemented in a data processing system, for determining run-time dependencies between logical components of a data processing environment, the method comprising the steps of:
    monitoring run-time activity of each of a first logical component and a second logical component of the data processing environment, said monitoring comprising determining a first activity period for said first logical component and a second activity period for said second logical component, wherein said determining comprises determining a first start time and a first end time for said first logical component and a second start time and a second end time for said second logical component;
    comparing the monitored run-time activity of the first logical component with the monitored run-time activity of the second logical component to identify correlations between the monitored run-time activity of the first and second logical components, said comparing comprising comparing said first activity period and said second activity period to identify correlations between said first logical component and said second logical component, wherein said comparing comprises determining whether said first start time is before said second start time and whether said first end time is after said second end time; and
    in response to identification of a positive correlation between the monitored run-time activity of the first and second logical components, recording the existence of a dependency relationship between the first and second logical components,
    wherein the step of monitoring the run-time activity of said first logical component and said second logical component is performed by a monitoring agent and comprises generating events by the monitoring agent in response to completion of the processing of poll requests by each of the first logical component and said second logical component, and wherein the step of comparing the monitored run-time activity comprises:
    calculating an activity period for each of said first logical component and said second logical component in response to the generated events indicating the completion of processing of the poll requests by the respective one of said first logical component and said second logical component; and
    determining whether the activity period of said first logical component contains the activity period of said second logical component.

2. The method according to claim 1, all the limitations of which are incorporated herein by reference, further comprising the steps of:
    monitoring run-time activity data of each of a plurality of logical components additional to said first and second logical components;
    comparing the monitored run-time activity of the first logical component with the monitored run-time activity of the plurality of logical components to identify positive correlations between the monitored run-time activity of the first logical component and the monitored run-time activity of any of the plurality of logical components; and recording the existence of a dependency relationship between the first logical component and any of the plurality of logical components for which a positive correlation is identified.

3. The method according to claim 2, all the limitations of which are incorporated herein by reference, further comprising aggregating the recorded dependency relationships of the first logical component.

4. The method according to claim 2, all the limitations of which are incorporated herein by reference, further comprising:
comparing the monitored run-time activity of the second logical component with the run-time activity of each of the plurality of logical components to identify positive correlations between the monitored run-time activity of the second logical component and the monitored run-time activity of any of the plurality of logical components; and
recording the existence of a dependency relationship between the second logical component and any of the plurality of logical components for which a positive correlation is identified.

5. The method according to claim 1, all the limitations of which are incorporated herein by reference, wherein the comparing step comprises determining whether the activity period of the first logical component contains the activity period of the second logical component.

6. The method according to claim 1, all the limitations of which are incorporated herein by reference, wherein the step of monitoring run-time activity comprises monitoring invocations of the first and second logical components, and the comparing step comprises comparing the number of invocations of each of the first and second logical components within a monitoring period.

7. The method according to claim 1, all the limitations of which are incorporated herein by reference, further comprising:
monitoring run-time activity for a plurality of executions of each of the first and the second logical component,
comparing the monitored run-time activity for the plurality of executions of the second logical component with the monitored run-time activity for the plurality of executions of the first logical component;
determining a proportion of executions of the first logical component for which a positive correlation is identified between the compared run-time activity of the first and second logical components; and
recording in association with the recorded dependency relationship a value representing the determined proportion of executions of the first logical component for which a positive correlation is identified.

8. The method according to claim 1, all the limitations of which are incorporated herein by reference, further comprising:
monitoring run-time activity for a plurality of executions of each of the first and the second logical component,
comparing the monitored run-time activity for the plurality of executions of the second logical component with the monitored run-time activity for the plurality of executions of the first logical component;
determining a proportion of executions of the second logical component for which a positive correlation is identified between the compared run-time activity of the first and second logical components; and
recording in association with the recorded dependency relationship a value representing the determined proportion of executions of the second logical component for which a positive correlation is identified.

9. The method according to claim 7, all the limitations of which are incorporated herein by reference, further comprising:
determining a proportion of executions of the second logical component for which a positive correlation is identified between the compared run-time activity of the first and second logical components; and
recording in association with the recorded dependency relationship a value representing the determined proportion of executions of the second logical component for which a positive collation is identified; and
generating a weight value comprising a combination function of the determined proportions of executions of the first and second logical components, and storing the weight value in association with the recorded dependency relationship.

10. The method according to claim 1, all the limitations of which are incorporated herein by reference, comprising:
computing a probability value associated with a dependency relationship by determining, for a plurality of executions of the first and second components, the proportion of executions of the first component for which the activity period of the first component contains the activity period of the second component, and recording the probability value in association with the recorded dependency relationship.

11. The method according to claim 1, all the limitations of which are incorporated herein by reference, further comprising:
computing a probability associated with a dependency relationship by determining, for a plurality of executions of the first and second components, the proportion of executions of the second component for which the activity period of the first component contains the activity period of the second component, and recording the probability value in association with the recorded dependency relationship.

12. The method according to claim 1, all the limitations of which are incorporated herein by reference, wherein the events are generated in response to the monitoring agent polling the first and second components for information relating to the processing of requests.

13. The method according to claim 1, all the limitations of which are incorporated herein by reference, wherein the events are generated by a publish/subscribe broker which receives run-time activity data from the first and second logical components, identifies a subscriber by reference to stored subscription information, and sends the generated events to the identified subscriber.

14. The method according to claim 1, all the limitations of which are incorporated herein by reference, for monitoring a data processing system which comprises a monitoring interface for accessing run-time activity data within the data processing system, wherein the step of monitoring run-time activity comprises the monitoring agent accessing run-time activity data via the monitoring interface.

15. The method according to claim 14, all the limitations of which are incorporated herein by reference, wherein the monitoring agent comprises an aggregator for aggregating run-time activity data accessed via the monitoring interface.

16. The method according to claim 14, all the limitations of which are incorporated herein by reference, wherein the monitoring agent comprises program code for computing run-time activity metrics from the run-time activity data accessed via the monitoring interface.

17. The method according to claim 14, all the limitations of which are incorporated herein by reference, wherein the monitoring agent is configured to poll the first and second logical components via the monitoring interface.

18. A method of fault management comprising the steps of:
monitoring run-time activity of each of a first logical component and a plurality of additional logical components of a data processing environment, said monitoring comprising determining a first activity period for said first logical component and additional activity periods for said additional logical components, wherein said determining comprises determining a first start time and a first end time for said first logical component and additional start times and additional end times for said additional logical components;
comparing the monitored run-time activity of the first logical component with the monitored run-time activity of each of the plurality of additional logical components, to identify positive correlations between the monitored run-time activity of the first logical component and the monitored run-time activity of any of the plurality of additional logical components, said comparing comprising comparing said first activity period and said additional activity periods to identify correlations between said first logical component and any of said additional logical components, wherein said comparing comprises determining whether said first start time is before said additional start times and whether said first end time is after said additional end times;
recording the existence of a dependency relationship between the first logical component and any of the plurality of additional logical components for which a positive correlation is identified;
aggregating the recorded dependency relationships to determine a set of logical components having dependency relationships with the first logical component; and
responding to identification of a problem affecting the first logical component by analyzing the additional logical components having dependency relationships with the first logical component,
wherein the step of monitoring the run-time activity of said first logical component and said additional logical components is performed by a monitoring agent and comprises generating events by the monitoring agent in response to completion of the processing of poll requests by each of said first logical component and said additional logical components, and wherein the step of comparing the monitored run-time activity comprises:
calculating an activity period for each of said first logical component and said additional logical components in response to the generated events indicating the completion of processing of the poll requests by the respective one of said first logical component and said additional logical components; and
determining whether the activity period of said first logical component contains the activity period of said additional logical components.

19. The method according to claim 18, all the limitations of which are incorporated herein by reference, wherein the step of aggregating the recorded dependency relationships comprises sorting the dependencies into an order determined by a sorting heuristic, and the step of analyzing the additional logical components comprises analyzing components of the additional logical components in said determined order.

20. A method for determining a set of logical components of a data processing environment which are likely to be affected by termination of a first logical component of the data processing environment, the method comprising:
monitoring run-time activity of each of a first logical component and a plurality of additional logical components of a data processing environment, said monitoring comprising determining a first activity period for said first logical component and additional activity periods for said additional logical components, wherein said determining comprises determining a first start time and a first end time for said first logical component and additional start times and additional end times for said additional logical components;
comparing the monitored run-time activity of the first logical component with the monitored run-time activity of each of the plurality of additional logical components, to identify positive correlations between the monitored run-time activity of the first logical component and the monitored run-time activity of any of the plurality of additional logical components, said comparing comprising comparing said first activity period and said additional activity periods to identify correlations between said first logical component and any of said additional logical components, wherein said comparing comprises determining whether said first start time is before said additional start times and whether said first end time is after said additional end times; and
recording the existence of a dependency relationship between the first logical component and any of the plurality of additional logical components for which a positive correlation is identified; and
aggregating the recorded dependency relationships to determine additional logical components having dependency relationships with the first logical component,
wherein the step of monitoring the run-time activity of said first logical component and said additional logical components is performed by a monitoring agent and comprises generating events by the monitoring agent in response to completion of the processing of poll requests by each of said first logical component and said additional logical components, and wherein the step of comparing the monitored run-time activity comprises:
calculating an activity period for each of said first logical component and said additional logical components in response to the generated events indicating the completion of processing of the poll requests by the respective one of said first logical component and said additional logical components; and
determining whether the activity period of said first logical component contains the activity period of said additional logical components.

21. A computer program product comprising a recordable storage medium having program code for controlling the operation of a data processing system on which the program code executes to determine run-time dependencies between logical components of a data processing environment, the program code comprising:
at least one monitoring agent for monitoring run-time activity data of a first logical component and a second logical component of the data processing environment, said monitoring comprising determining activity periods for said first and second logical components, and for sending the monitored run-time activity data to a correlation identifier;
a correlation identifier for receiving, from the at least one monitoring agent, monitored run-time activity data of each of the first logical component and the second logical component of a data processing environment, wherein said receiving comprises receiving a first staff time and a first end time for said first logical component and a second start time and a second end time for said second logical component, and for comparing the monitored run-time activity data of the first logical component with the monitored run-time activity data of the second logical component to identify positive correlations between the monitored run-time activity of the first and second logical components, said comparing comprising comparing said activity periods of said first and second logical components to identify correlations between said first logical component and said second logical component, wherein said comparing comprises determining whether said first start time is before said second start time and whether said first end time is after said second end time; and a dependency generator for responding to identification of a positive correlation between the monitored run-time activity of the first and second logical components by recording the existence of a dependency relationship between the first and second logical components, wherein said monitoring run-time activity data of the first and second logical components comprises generating events by the at least one monitoring agent in response to completion of the processing of poll requests by each of the first and second logical components, and wherein said comparing the monitored run-time activity comprises:

calculating an activity period for each of the first and second logical components in response to the generated events indicating the completion of processing of the poll requests by the respective one of the first and second logical components; and determining whether the activity period of the first logical component contains the activity period of the second logical component.

22. A computer program product comprising a recordable storage medium having program code for controlling the operation of a data processing system on which the program code executes to determine run-time dependencies between logical components of a data processing environment, the program code comprising:

a correlation identifier:

for receiving, from at least one monitoring agent, monitored run-time activity data of each of a first logical component and a second logical component of a data processing environment, said receiving comprising receiving a first activity period for said first logical component and a second activity period for said second logical component, wherein said receiving comprises receiving a first start time and a first end time for said first logical component and a second start time and a second end time for said second logical component, and for comparing the monitored run-time activity data of the first logical component with the monitored run-time activity data of the second logical component to identify positive correlations between the monitored run-time activity of the first and second logical components, said comparing comprising comparing said first activity period and said second activity period to identify correlations between said first logical component and said second logical component, wherein said comparing comprises determining whether said first start time is before said second start time and whether said first end time is after said second end time; and a dependency generator for responding to identification of a positive correlation between the monitored run-time activity of the first and second logical components by generating a representation of the existence of a dependency relationship between the first and second logical components, wherein said at least one monitoring agent monitors the run-time activity of said first logical component and said second logical component and generates events in response to completion of the processing of poll requests by each of said first logical component and said second logical component, and wherein the step of comparing the monitored run-time activity comprises:

calculating an activity period for each of said first logical component and said second logical component in response to the generated events indicating the completion of processing of the poll requests by the respective one of said first logical component and said second logical component; and determining whether the activity period of said first logical component contains the activity period of the second component.

23. A method for discovering dependencies between monitored components of a managed data processing system, comprising the steps of:

accessing, from the managed system, run-time activity data for the monitored components, said accessing comprising accessing activity periods for said monitored components, wherein said accessing comprises accessing a first start time and a first end time for a first logical component of said monitored components and a second start time and a second end time for a second logical component of said monitored components;

comparing the accessed run-time activity data of the monitored components to identify positive correlations between the run-time activity of the monitored components, said comparing comprising comparing said activity periods to identify correlations between said monitored components, wherein said comparing comprises determining whether said first start time is before said second start time and whether said first end time is after said second end time; and generating an identification of a dependency relationship between the first and second logical components for which a positive correlation is identified, wherein a monitoring agent monitors the run-time activity of said first logical component and said second logical component and generates events in response to completion of the processing of poll requests by each of the first and second logical components, and wherein the step of comparing the monitored run-time activity comprises:

calculating an activity period for each of said first logical component and said second logical component in response to generated events indicating the completion of processing of the poll requests by the respective one of said first logical component and said second logical component; and determining whether the activity period of said first logical component contains the activity period of said second logical component.

24. The method according to claim 23, all the limitations of which are incorporated herein by reference, wherein the step of accessing comprises accessing the run-time activity data via an API provided by the managed data processing system.

25. The method according to claim 23, all the limitations of which are incorporated herein by reference, wherein the step of comparing the accessed run-time activity data comprises comparing a plurality of run-time activity metrics for each monitored component.

26. The method according to claim 25, all the limitations of which are incorporated herein by reference, further comprising:

computing a value representing the consistency of identification of a positive correlation between the monitored components for the plurality of run-time activity metrics; and storing the computed value in association with the generated identification of a dependency relationship.

27. The method according to claim 25, all the limitations of which are incorporated herein by reference, wherein the step of comparing the accessed run-time activity data comprises comparing run-time activity data for a plurality of executions of the monitored components, and wherein the method further comprises:

computing a single value representing the consistency of identification of a positive correlation between the monitored components, for the plurality of executions of the monitored components and the plurality of run-time activity metrics; and storing the computed single value in association with the generated identification of a dependency relationship.

28. The method according to claim 23, all the limitations of which are incorporated herein by reference, wherein the step of comparing the accessed run-time activity data comprises comparing run-time activity data for a plurality of executions of the monitored components, and wherein the method further comprises:

computing a value representing the consistency of identification of a positive correlation between the monitored components for the plurality of executions of the monitored components; and storing the computed value in association with the generated identification of a dependency relationship.

\* \* \* \* \*